(12) United States Patent
Adamek et al.

(10) Patent No.: US 11,097,215 B2
(45) Date of Patent: *Aug. 24, 2021

(54) ASSEMBLIES; COMPONENTS AND FILTER FEATURES THEREOF; AND, METHODS OF USE AND ASSEMBLY

(71) Applicant: Donaldson Company, Inc., Minneapolis, MN (US)

(72) Inventors: Daniel E. Adamek, Bloomington, MN (US); Richard J. Osendorf, West St. Paul, MN (US); Benny K. Nelson, Waconia, MN (US); Joseph A. Einberger, Oakdale, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/713,632

(22) Filed: Dec. 13, 2019

(65) Prior Publication Data

US 2020/0246739 A1 Aug. 6, 2020

Related U.S. Application Data

(63) Continuation of application No. 16/042,280, filed on Jul. 23, 2018, now Pat. No. 10,518,204, which is a
(Continued)

(51) Int. Cl.
*B01D 46/00* (2006.01)
*B01D 46/24* (2006.01)
*B01D 46/42* (2006.01)

(52) U.S. Cl.
CPC ..... *B01D 46/0004* (2013.01); *B01D 46/0024* (2013.01); *B01D 46/2411* (2013.01);
(Continued)

(58) Field of Classification Search
CPC ........ B01D 46/00; B01D 46/24; B01D 46/42; B01D 46/0004; B01D 46/0024;
(Continued)

(56) References Cited

U.S. PATENT DOCUMENTS

| 6,039,778 | A | * | 3/2000 | Coulonvaux | ...... F02M 35/0203 55/498 |
| 6,139,607 | A | * | 10/2000 | Coulonvaux | ...... B01D 46/0002 55/498 |
| 6,402,798 | B1 | | 6/2002 | Kallsen et al. | |
| 6,419,718 | B1 | | 7/2002 | Klug et al. | |

(Continued)

FOREIGN PATENT DOCUMENTS

WO 99/14483 3/1999

OTHER PUBLICATIONS

European Examination Report for Application No. 16176277.8 dated May 11, 2020.
(Continued)

*Primary Examiner* — Minh Chau T Pham
(74) *Attorney, Agent, or Firm* — Merchant & Gould P.C.

(57) ABSTRACT

An air cleaner assembly is disclosed, along with related methods. In one aspect, the air cleaner assembly has a housing including a housing body and a removable cover that together define an interior volume for holding a filter cartridge. The housing body can include a first plurality of lugs, wherein each of the first plurality of lugs has a first engagement surface disposed at a first angle that is oblique to a rotational plane of the cover. A second plurality of lugs can be provided on the cover, wherein each of the second plurality of lugs has a second engagement surface disposed at the first angle. A lock mechanism can also be provided that is disposed on the cover, wherein the lock mechanism includes a lock member axially movable between a locked position and an unlocked position to selectively secure the cover to the housing body.

20 Claims, 26 Drawing Sheets

Related U.S. Application Data continuation of application No. 15/192,272, filed on Jun. 24, 2016, now Pat. No. 10,029,198.

(60) Provisional application No. 62/184,567, filed on Jun. 25, 2015.

(52) U.S. Cl.
CPC ...... *B01D 46/4227* (2013.01); *B01D 2265/02* (2013.01); *B01D 2265/021* (2013.01); *B01D 2265/022* (2013.01); *B01D 2265/028* (2013.01)

(58) Field of Classification Search
CPC ............ B01D 46/2411; B01D 46/4227; B01D 2265/021; B01D 2265/02; B01D 2265/028; B01D 2265/022; B01D 29/21; B01D 35/30
USPC ......... 55/484, 493, 498, 502, 503, 504, 314, 55/520, 385.3; 123/198 E
See application file for complete search history.

(56) References Cited

U.S. PATENT DOCUMENTS

| | | |
|---|---|---|
| D467,654 S | 12/2002 | Klug et al. |
| D485,339 S | 1/2004 | Klug et al. |
| 10,029,198 B2* | 7/2018 | Adamek ............ B01D 46/0004 |
| 10,518,204 B2* | 12/2019 | Adamek ............ B01D 46/0004 |
| 2006/0086075 A1* | 4/2006 | Scott .................. B01D 46/0001 55/498 |
| 2008/0142425 A1 | 6/2008 | Hansen |
| 2008/0190082 A1 | 8/2008 | Scott et al. |
| 2009/0094951 A1 | 4/2009 | Baseotto et al. |
| 2010/0257828 A1 | 10/2010 | Shimomura et al. |
| 2014/0366494 A1 | 12/2014 | Ardes |
| 2015/0059302 A1 | 3/2015 | Kaufmann et al. |

OTHER PUBLICATIONS

Design application U.S. Appl. No. 29/131,120, filed Oct. 13, 2000.
Extended European Search Report for Application No. 1617627T8 dated Dec. 15, 2016.

* cited by examiner

ASSEMBLIES; COMPONENTS AND FILTER FEATURES THEREOF; AND, METHODS OF USE AND ASSEMBLY

RELATED APPLICATIONS

This application is a continuation of application Ser. No. 16/042,280, filed Jul. 23, 2018, now U.S. Pat. No. 10,518,204. application Ser. No. 15/192,272, filed Jun. 24, 2016, now issued as U.S. Pat. No. 10,029,198 B2 claims the benefit of Provisional Application Ser. No. 62/184,567, filed Jun. 25, 2015. Each of application Ser. Nos. 16/042,280; 15/192,272; and, 62/184,567 are incorporated herein by reference. A claim of priority is made to each of the above referenced Application Serial Nos. to the extent appropriate.

FIELD OF THE DISCLOSURE

The present disclosure relates to filter assemblies, for example air cleaner assemblies, and components and features thereof, and methods of assembly and use. The filter assemblies comprise a housing having a removable and replaceable filter cartridge therein. The filter cartridge is optionally configured with a housing seal arrangement, to advantage. Various features of filter housings and/or the cartridges are described, including features directed to securing the housing to a removable cover, which can provide for advantage. Methods of assembly and use are described.

BACKGROUND

Air or other gas filtering is desirable in a number of systems. A typical application is in the filtration of intake air to internal combustion engines. Another is in the filtration of crankcase ventilation filter assemblies. Typically, such systems comprise filter assemblies having a serviceable filter cartridge therein. After a period of use, filter media within a filter housing requires servicing, either through cleaning or complete replacement. Typically, for an air cleaner or crankcase ventilation filter assembly used with an internal combustion engine, for example on a vehicle, the filter media is contained in a removable and replaceable, i.e. serviceable, component, typically referred as a filter element or cartridge. The filter cartridge is configured to be removably sealed within the air cleaner, in use. Improvements in filter arrangements relating to assembly, serviceability, use are desirable.

SUMMARY

Filter assemblies (such as air cleaner assemblies or crankcase ventilation filter assemblies) components therefor; and, features thereof are described. Also described are methods of assembly and use. The filter assemblies generally comprise a housing assembly having a filter cartridge removably positioned therein. The housing assembly includes a housing body and a removable cover which can be secured together in an axial direction through the interaction of respective lugs located on the housing body and on the cover.

The lugs on the housing body can be engaged with the lugs on the cover by first axially displacing the cover towards the housing body along the longitudinal axis of the housing assembly until the lugs on the cover move past the lugs on the housing body. At this point, the cover can be rotated in a direction C about the longitudinal axis such that a ramped engagement surface of each lug is brought into engagement with a ramped engagement surface of a corresponding lug. As this rotation occurs, the respective ramped engagement surfaces will function to draw the cover towards the housing body in an axial direction until a stop surface on the cover comes into contact with an open end of the housing body, at which point further rotation is prevented. To hold the cover in this position relative to the housing body, a lock mechanism can be provided which includes a lock member that can be inserted between two adjacent lugs such that the cover cannot be rotated in the reverse direction to disengage the lugs such that the cover can be removed from the housing body.

In one example, an air cleaner is disclosed having a housing including a housing body and a removable cover that together define an interior volume for holding a filter cartridge. The removable cover can be rotatable with respect to the housing body along a plane of rotation. The housing body can include a first plurality of lugs, wherein each of the first plurality of lugs has a first engagement surface disposed at a first angle that is oblique to the plane of rotation. A second plurality of lugs can be provided on the cover, wherein each of the second plurality of lugs has a second engagement surface disposed at the first angle. A lock mechanism can also be provided that is disposed on the cover, wherein the lock mechanism includes a lock member axially movable between a locked position and an unlocked position.

In one aspect, the cover is positionable between a secured position and an unsecured position. In the secured position, at least one of the first engagement surfaces of the first plurality of lugs is in overlapping contact with at least one of the second engagement surfaces of the second plurality of lugs such that the cover is prevented from rotating in a first direction along the plane of rotation and wherein the lock member extends between two of the first plurality of lugs to prevent the cover from being rotated in a second direction opposite the first direction. In the unsecured position, the lock member is removed from between the two of the first plurality of ramped lugs such that the cover can be rotated in the second direction.

The air cleaner assembly can also be configured such that each of the first plurality of lugs includes a guide surface disposed at a second angle that is oblique to the plane of rotation, wherein the guide surface is for guiding the lock member towards a first side of one of the first plurality of lugs as the lock member is being displaced between two of the first plurality of lugs. A guide member extending from the guide surface of each of the first plurality of lugs can also be provide and can act to constrain the movement of the lock member along the guide surface.

There is no specific requirement that an air cleaner assembly, component therefor, or feature thereof include all of the detail characterized herein, to obtain some advantage according to the present disclosure.

DETAILED DESCRIPTION

Herein, an example filter assemblies, features and components therefor are described and depicted. A variety of specific features and components are characterized in detail. Many can be applied to provide advantage. There is no specific requirement that the various individual features and components be applied in an overall assembly with all of the features and characteristics described, however, in order to provide for some benefit in accord with the present disclosure.

Figure 1:
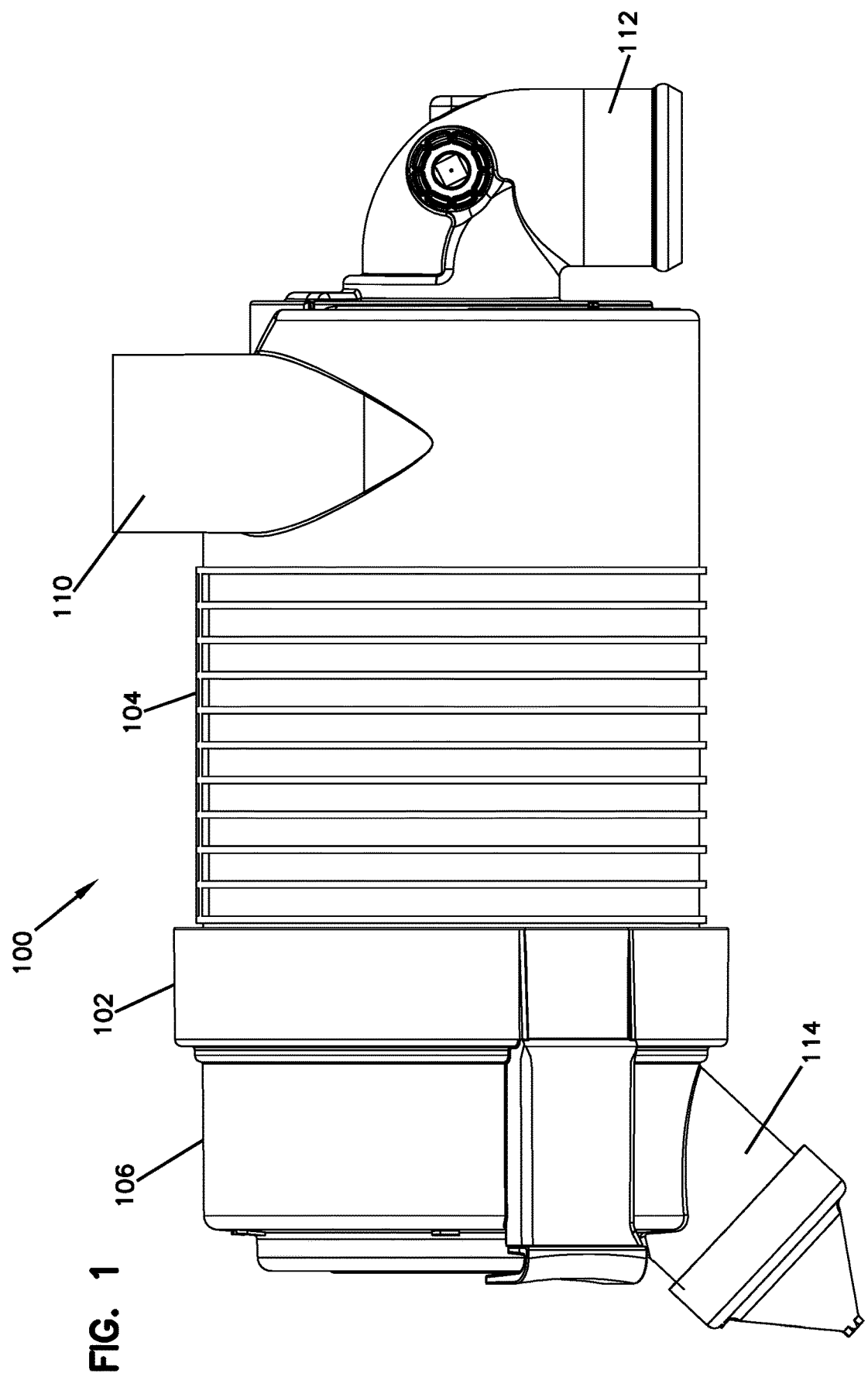
FIG. 1 is a schematic side view of an air cleaner assembly having features in accordance with the present disclosure.
Figure 2:
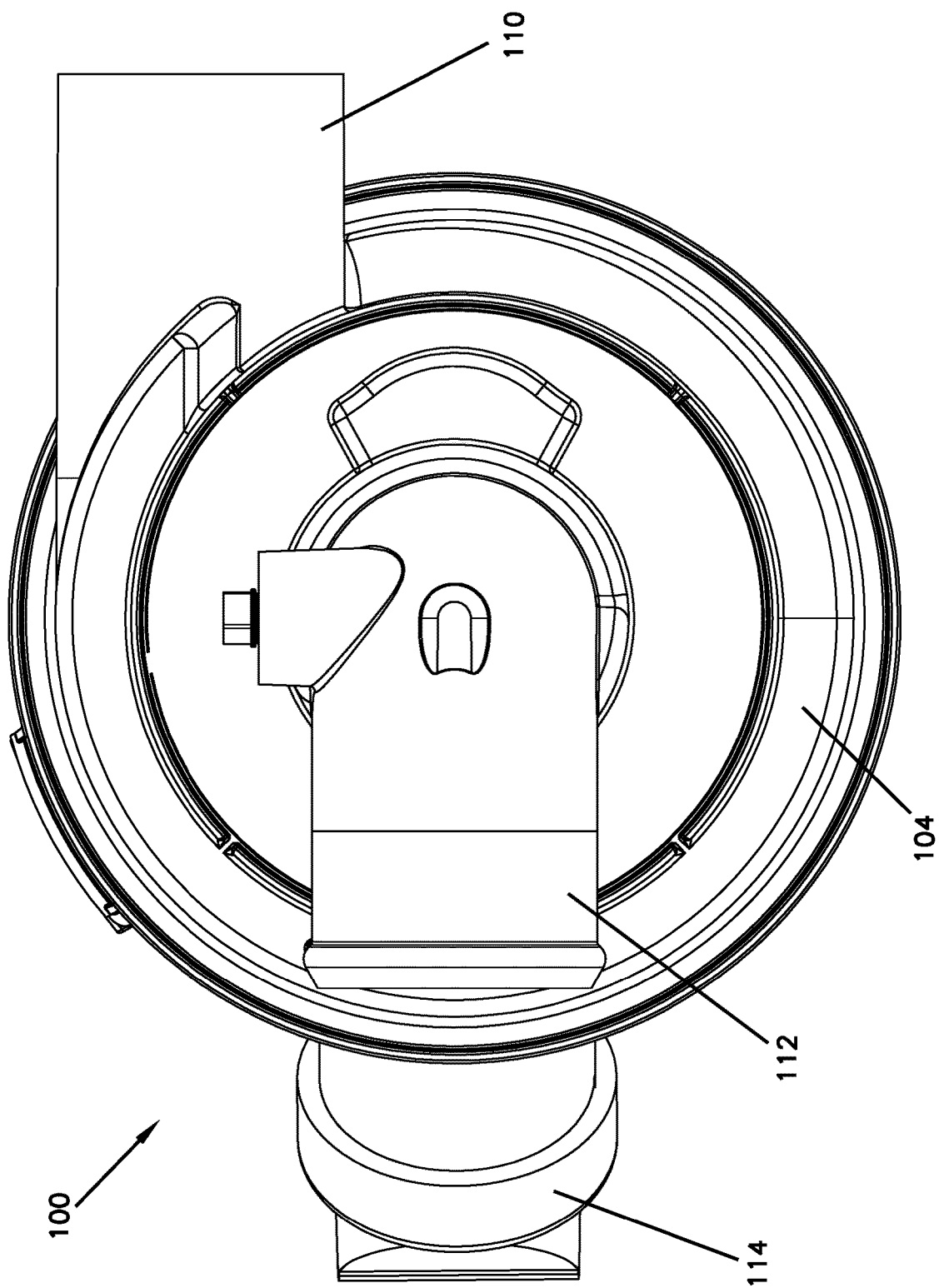
FIG. 2 is a schematic top view of the air cleaner assembly shown in FIG. 1.
Figure 3:
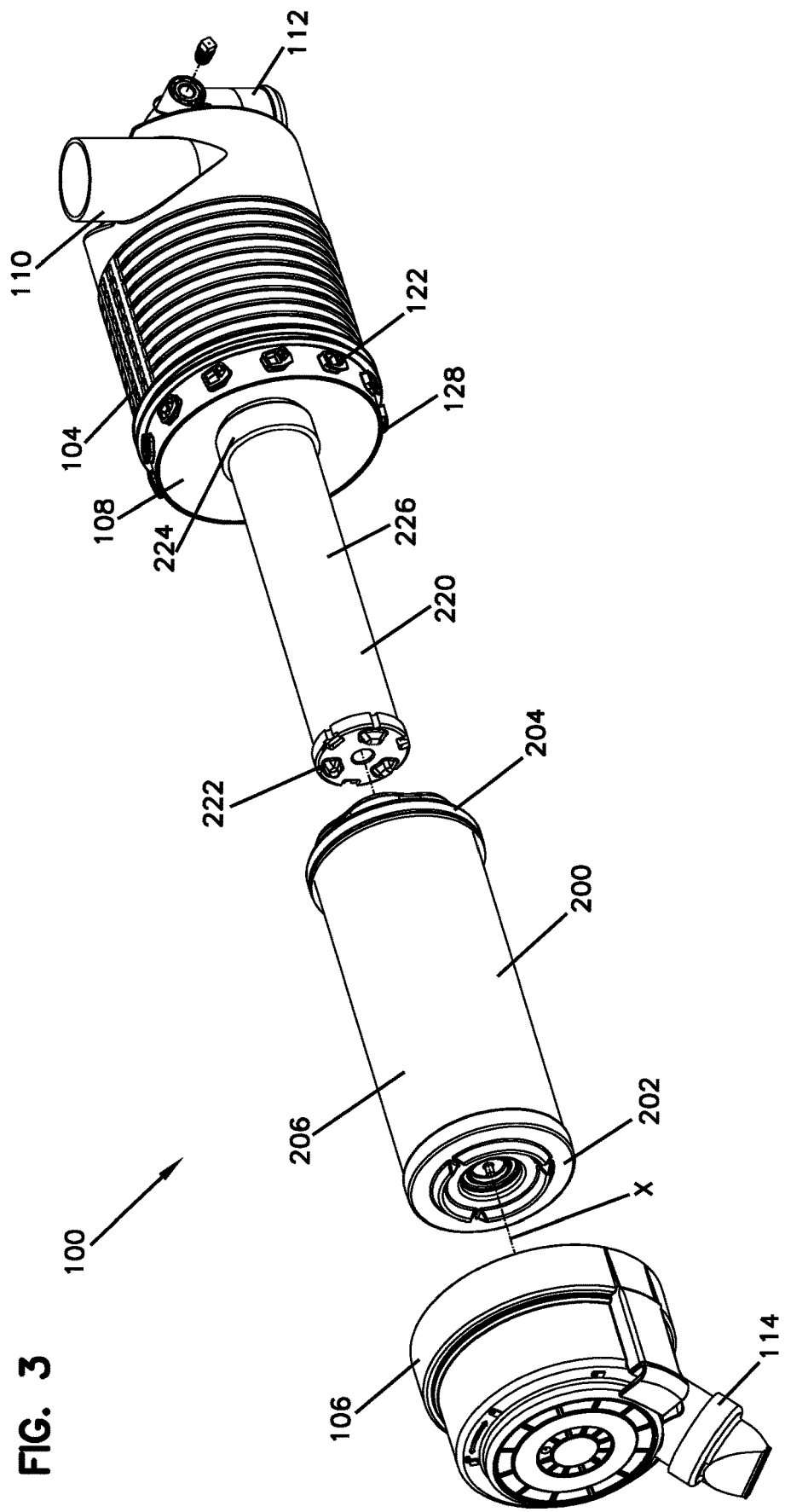
FIG. 3 is a schematic exploded perspective view of the air cleaner assembly shown in FIG. 1.
Figure 4:
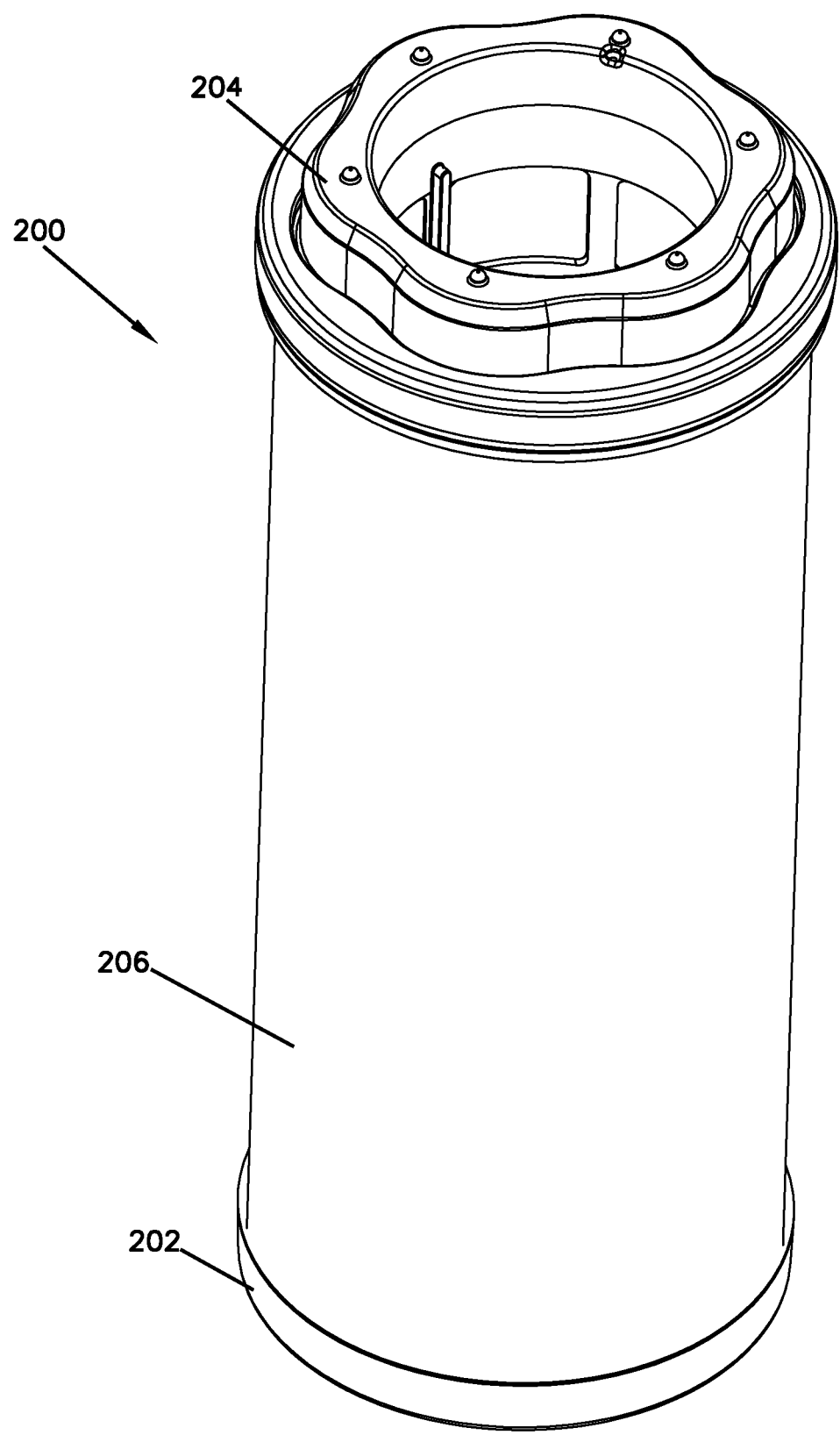
FIG. 4 is a schematic perspective view of a primary filter cartridge of the air cleaner assembly shown in FIG. 1.
Figure 5:
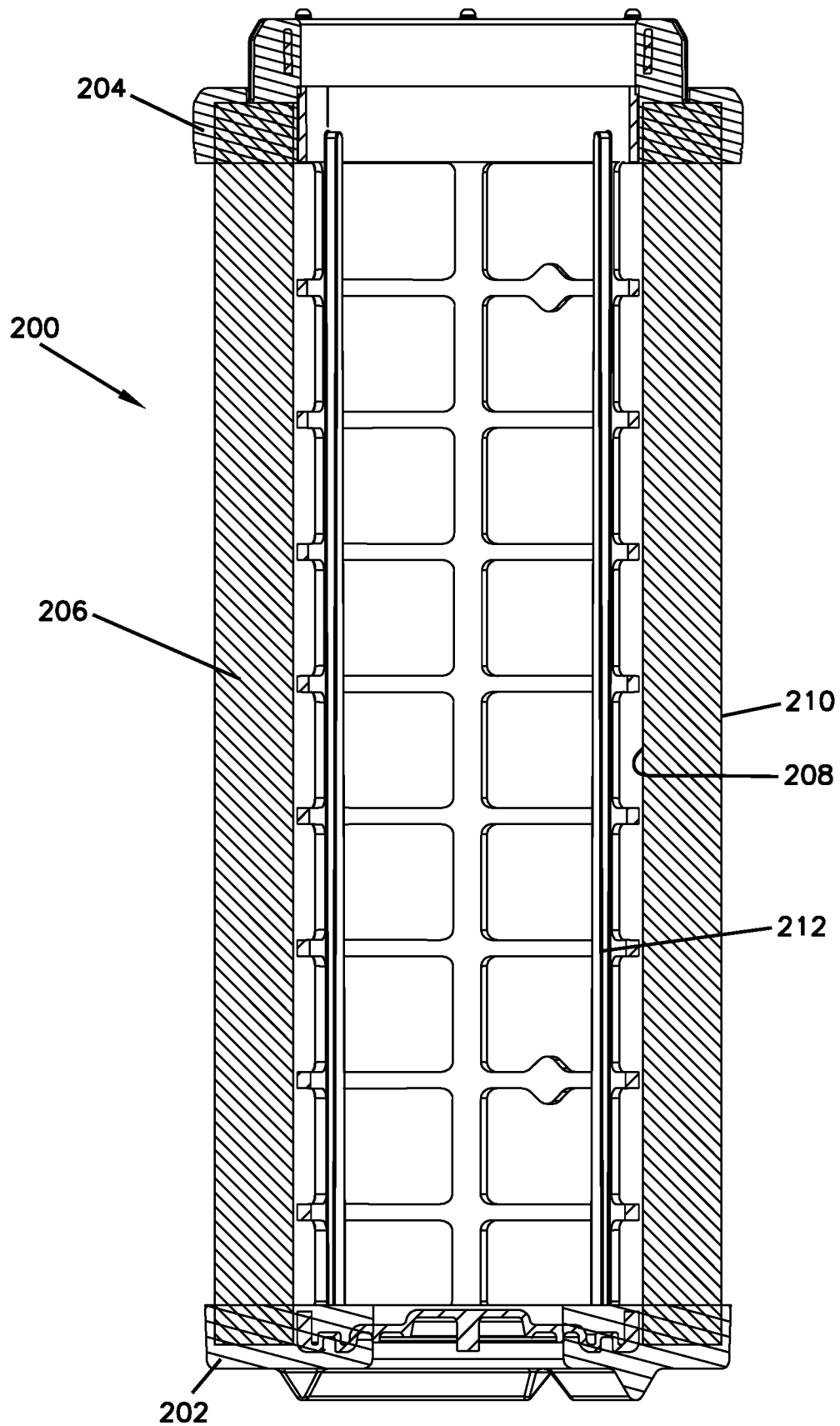
FIG. 5 is schematic cross-sectional view of the primary filter cartridge shown in FIG. 4.
Figure 6:
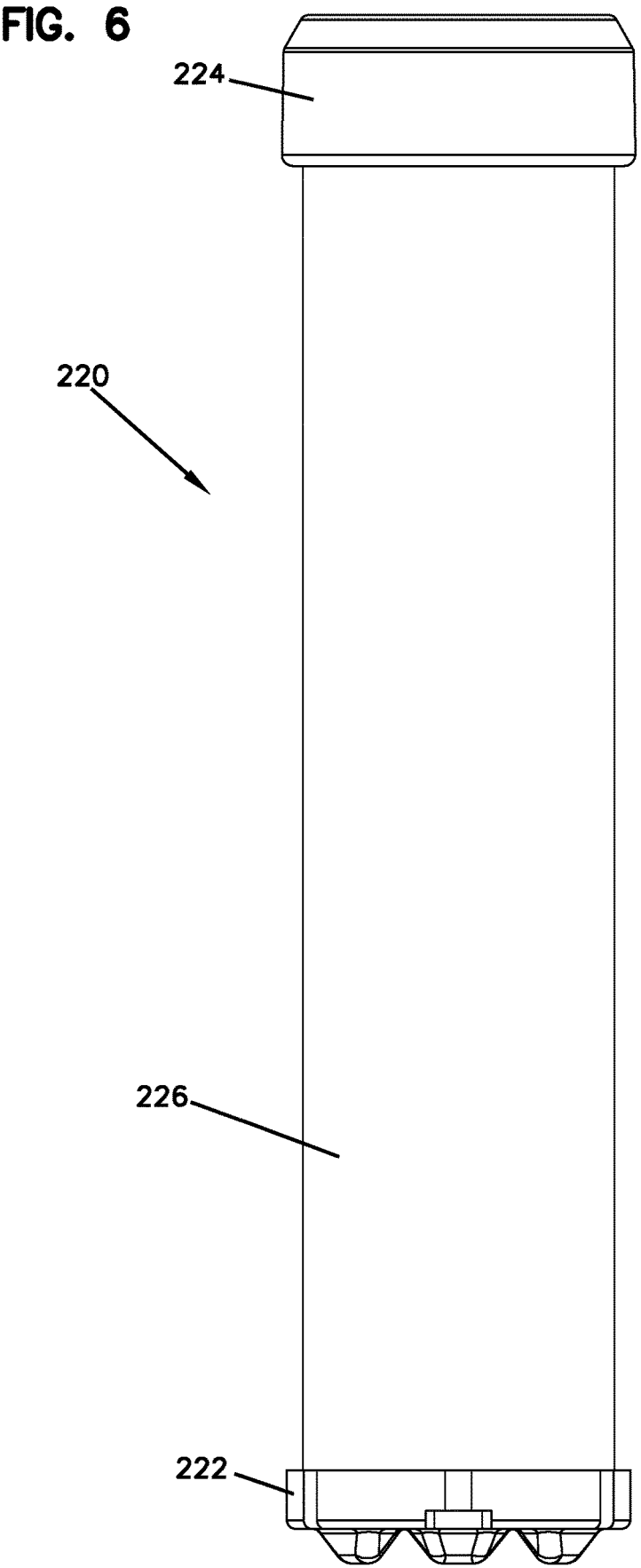
FIG. 6 is a schematic side view of a secondary filter cartridge of the air cleaner assembly shown in FIG. 1.
Figure 7:
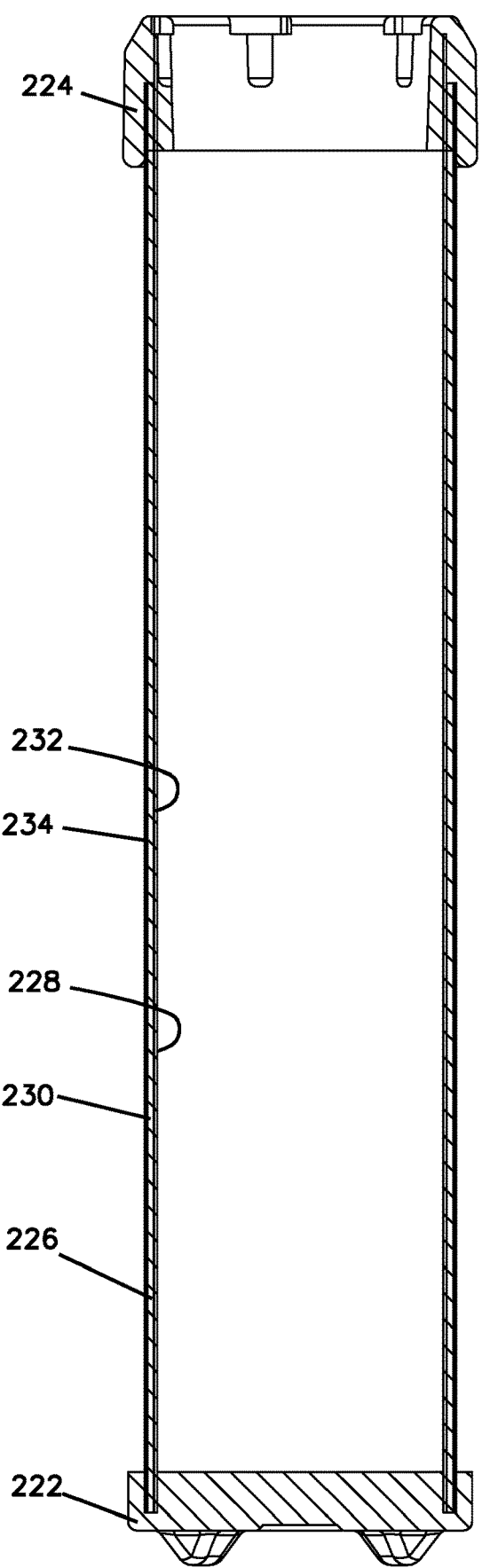
FIG. 7 is schematic cross-sectional view of the secondary filter cartridge shown in FIG. 4.

Referring to FIG. 1, an air cleaner assembly 100 is shown. In one aspect, the air cleaner assembly 100 includes a housing assembly 102 including a housing body 104 and a removable cover 106. When the cover 106 is attached to the housing body 104, the cover 106 and housing body 104 define an interior volume 108. The air cleaner assembly 100 is also shown as including a primary filter cartridge 200 and a secondary filter cartridge 220, both of which are disposed within the interior volume 108 of the air cleaner assembly 100.

As shown, the primary filter cartridge 200 includes a closed end cap 202 and an open end cap 204, between which filter media 206 extends. In one example, the end caps 202, 204 are formed from a molded polyurethane material. As shown, filter media 206 is pleated cellulosic media arranged into a tubular, cylindrical shape defining an interior 208 and an exterior side 210. A support tube 212, which may formed from a plastic or metal material, is provided at the interior 208 of the media 206 to support the media 206. Other configurations for the primary filter cartridge 200 are possible without departing from the concepts presented herein. An example primary filter cartridge usable with the air cleaner assembly 100 disclosed herein is fully shown and described in U.S. Pat. No. 8,864,866, issued on Oct. 21, 2014, the entirety of which is incorporated by reference herein.

As shown, the secondary filter cartridge 220 includes a closed end cap 222 and an open end cap 224, between which filter media 226 extends. In one example, the end caps 222, 224 are formed from a molded polyurethane material. As shown, filter media 226 is a synthetic non-pleated fabric media arranged into a tubular, cylindrical shape defining an interior 228 and an exterior side 230. An inner liner 232 is provided at the interior 208 of the media 206 and an outer liner 234 is provide at the exterior side 230 of the media 206 to support the media 206. The liners 232, 234 may be formed from a plastic or metal material. Other configurations for the secondary filter cartridge 220 are possible without departing from the concepts presented herein. An example secondary filter cartridge usable with the air cleaner assembly 100 disclosed herein is fully shown and described in U.S. Pat. No. 8,864,866.

The housing body 104 is further shown as having an air inlet 110 and a rotatable air outlet 112. As configured, the secondary filter cartridge 220 is mounted within the housing body 104 such that the open end cap 224 seals to a portion of the housing body 104 to place the interior 228 of the secondary filter cartridge 220 in fluid tight communication with the air outlet 112. In the embodiment shown, the open end cap 224 forms an outwardly directed radial seal against a portion of the housing. The primary filter cartridge 200 is mounted within the housing body 104 and over the secondary filter cartridge 220 such that the secondary filter cartridge 220 is received within the interior 208 of the primary filter cartridge 200. The open end cap 204 of the primary filter cartridge 200 seals to a portion of the housing body 104 such that the interior 208 of the primary filter cartridge 200 is in fluid tight communication with the secondary filter cartridge interior 208. In operation, with the cover 106 attached to the housing body 104, unfiltered air flows into the air inlet 110 and passes through the media 206 from the main filter cartridge exterior side 210 to the interior 208. The air then flows through the secondary filter cartridge media 226 from the exterior side 230 to the interior 228, where the fully filtered air the passes through the outlet 112 and to connected equipment, such as the air intake system of an internal combustion engine. The cover 106 can be provided with a dust ejection valve 114 to discharge accumulated particulates from the interior volume 108 of the housing assembly 102.

To secure the cover 106 to the housing body 104, a twist-lock arrangement 120 is provided in which a plurality of lugs 122 are provided on a wall 129 of the housing body 104 that engage with a plurality of ramped lugs 124 on the cover 106. By use of the term "lug" it is meant to include any type of protrusion that extends from a sidewall. Examples of protrusions within the meaning of the term lug are protrusions having a geometrically or irregularly shaped cross-section, protrusions configured to provide a single point of contact, protrusions having an elongated surface, protrusions having a continuous or discontinuous surface, and groups of independently formed protrusions. As presented, the lugs 122, 124 are integrally molded projections extending radially outwardly from the housing body 104 and extending radially inwardly from the cover 106, respectively.

In the particular embodiment shown, twelve lugs 122 are provided while six lugs 124 are provided. However, it is noted that the number of lugs 122 may be equal to or less than the number of lugs 124. Other quantities of lugs 122, 124 may be provided, such as one lug 122, 124, two lugs 122, 124, four lugs 122, 124, and six lugs 122, 124. In one example, a single lug 122 is provided on the housing body 104 and a single lug 124 is provided on the cover 106. In such a case, an additional alignment feature may be provided to ensure that the cover 106 is properly oriented with respect to the housing body 104 such that the single lugs 122, 124 will be properly engaged upon rotation of the cover 106. In one example, a single lug 124 is provided on the cover 106 while two or more lugs 122 are provided on the housing body. Providing two or more lugs 124 on the cover 106 can be advantageous over the previously described example in which only one lug 122 and one lug 124 are provided. For example, providing two or more lugs 124 on the cover 106 increases the number of possible locking positions of the cover 106 onto the housing body 104. To illustrate, the lug 124 can engage with either the first lug 122 or the second lug 122 on the housing body, or any other lug 122 additionally provided on the housing body 104. Additionally, the maximum rotation of the cover 106 on the housing body 104 required to lock the cover 106 to the housing body 104 is decreased as the number of lugs 122 are increased. To illustrate, the cover 106 may be required to rotate almost 360 (minus the length of the lug 12) in order to bring the cover lug 124 into engagement with a lug 122 when only one lug 122 is provided. However, providing two lugs 124 reduces the maximum rotation to less than 180 degrees, providing three lugs reduces the maximum rotation to less than 120 degrees, and so on. In one example, a single lug 122 is provided on the housing body while two or more lugs 124 are provided on the cover 106. Including two or more lugs 124 for the single lug 122 can provide the same advantages as previously described for the example in which a single lug 124 and two or more lugs 122 are provided.

Figure 8:
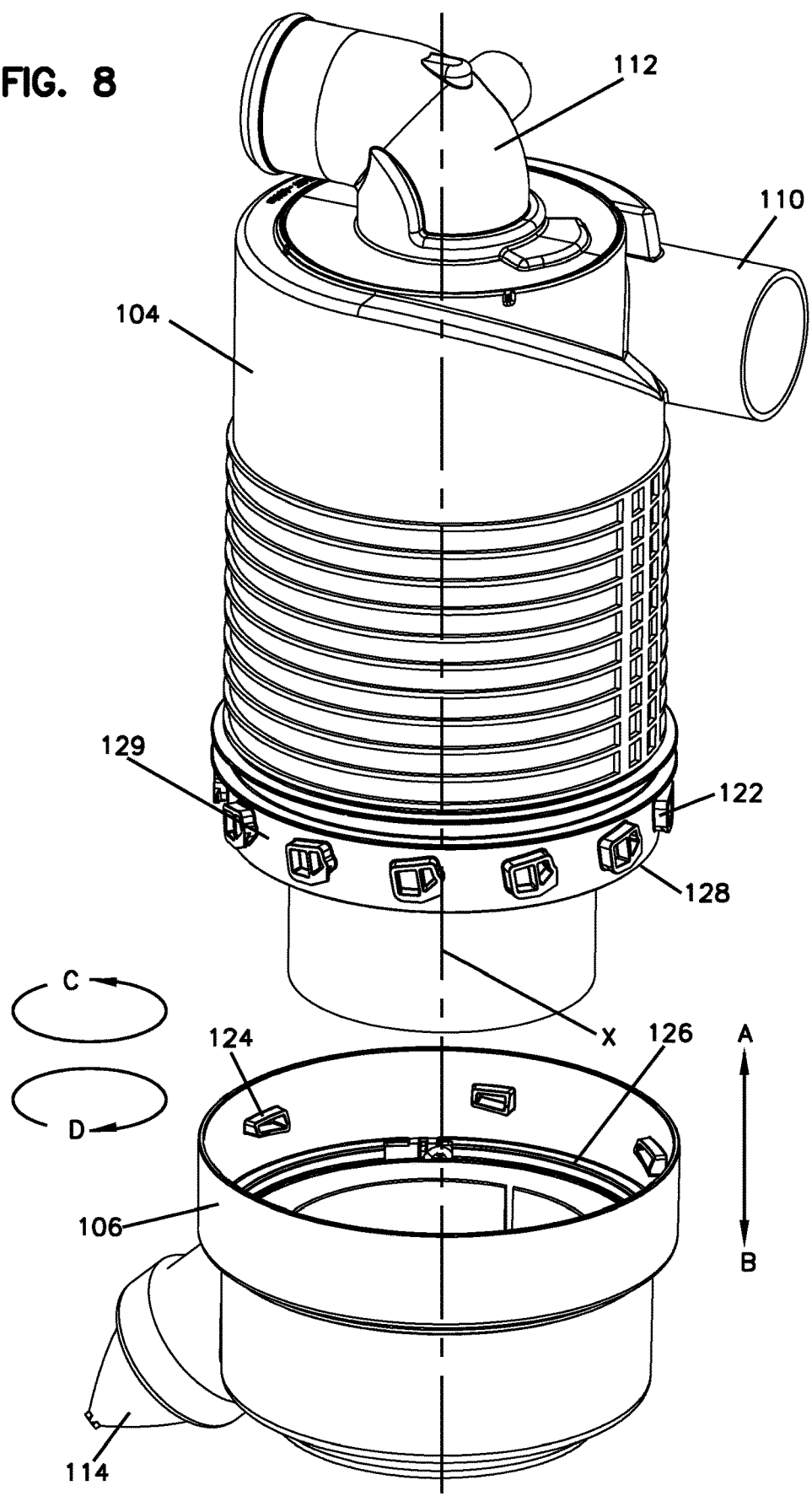
FIG. 8 is a schematic partially exploded perspective view of the air cleaner assembly shown in FIG. 1 with the cover removed from the housing body.

To install the cover 106 onto the housing body 104, the cover 106 is aligned with longitudinal axis X of the housing body 104 and is oriented such that lugs 124 are aligned between the lugs 122, as shown at FIG. 8. The lugs 122 and 124 necessarily lie along a common or near-common diameter to enable the lugs 122, 124 to engage with each other. As such, the lugs 124 must be rotationally aligned between the lugs 122 in order for the cover 106 to be fully installed onto the housing body 104. Once aligned, the cover 106 can then axially displaced towards the housing body 104 along the axis X in a direction A until ramped engagement surfaces 124a of the lugs 124 move partially past ramped engagement surfaces 122a of the lugs 122. This position can be seen at the schematic provided at FIG. 9 where it can be seen that the lug 124 has been at partially displaced below the lug 122.

By use of the terms "ramped" in relation to a surface or engagement surface, it is meant to indicate a surface that is disposed at an oblique angle relative to the plane of rotation R. As the longitudinal axis X is at a right angle to the plane of rotation, the ramped surface is also disposed at an oblique angle to the axis X. The ramped surface may be a planar surface, a curved surface, a smooth surface free of protrusions and indentations, or a surface including protrusions and/or indentations. In the embodiment shown, the ramped engagement surfaces 122a, 124a are smooth, planar surfaces. Where a ramped surface is referred to as an engagement surface in configurations where at least a portion of the surface is configured to come into contact with another surface. For example, ramped engagement surface 124a is configured to come into direct contact with a ramped engagement surface 122a. As shown, each of the ramped engagement surfaces 122a, 124a of the lugs 122, 124 is disposed at a first angle a relative to the plane of rotation R. As such, the ramped surface 122a is parallel to the ramped surface 124a. In one example, the first angle is about 10 degrees. However, other oblique angles may also be utilized without departing from the concepts presented herein. The angle of the engagement surface 122a can also be a different angle than that of the engagement surface 124a, although a single or reduced point of contact between the lugs 122, 124 might be expected to occur rather than having the majority of the lengths of the surfaces 122a, 124a in contact with each other.

Figure 10:
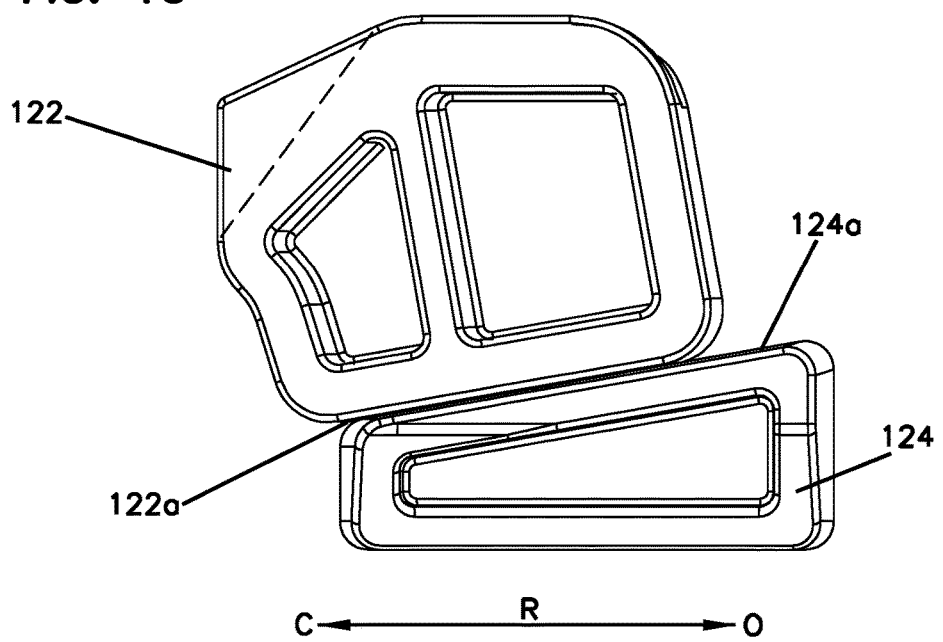
FIG. 10 is a schematic elevational view of the lugs shown in FIG. 9 in an engaged position.
Figure 11:
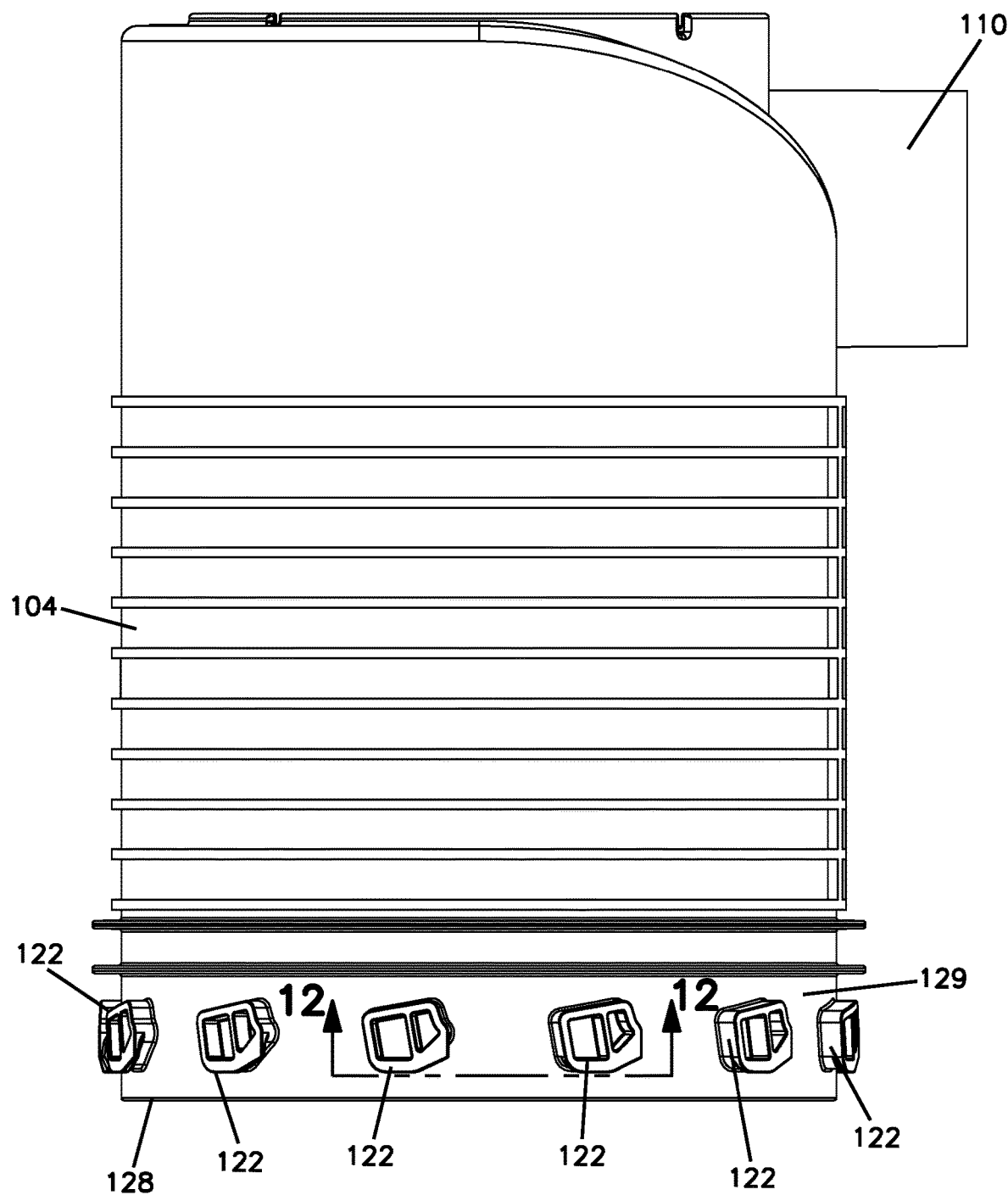
FIG. 11 is a schematic side view of the housing body of the air cleaner assembly shown in FIG. 1.
Figure 12:
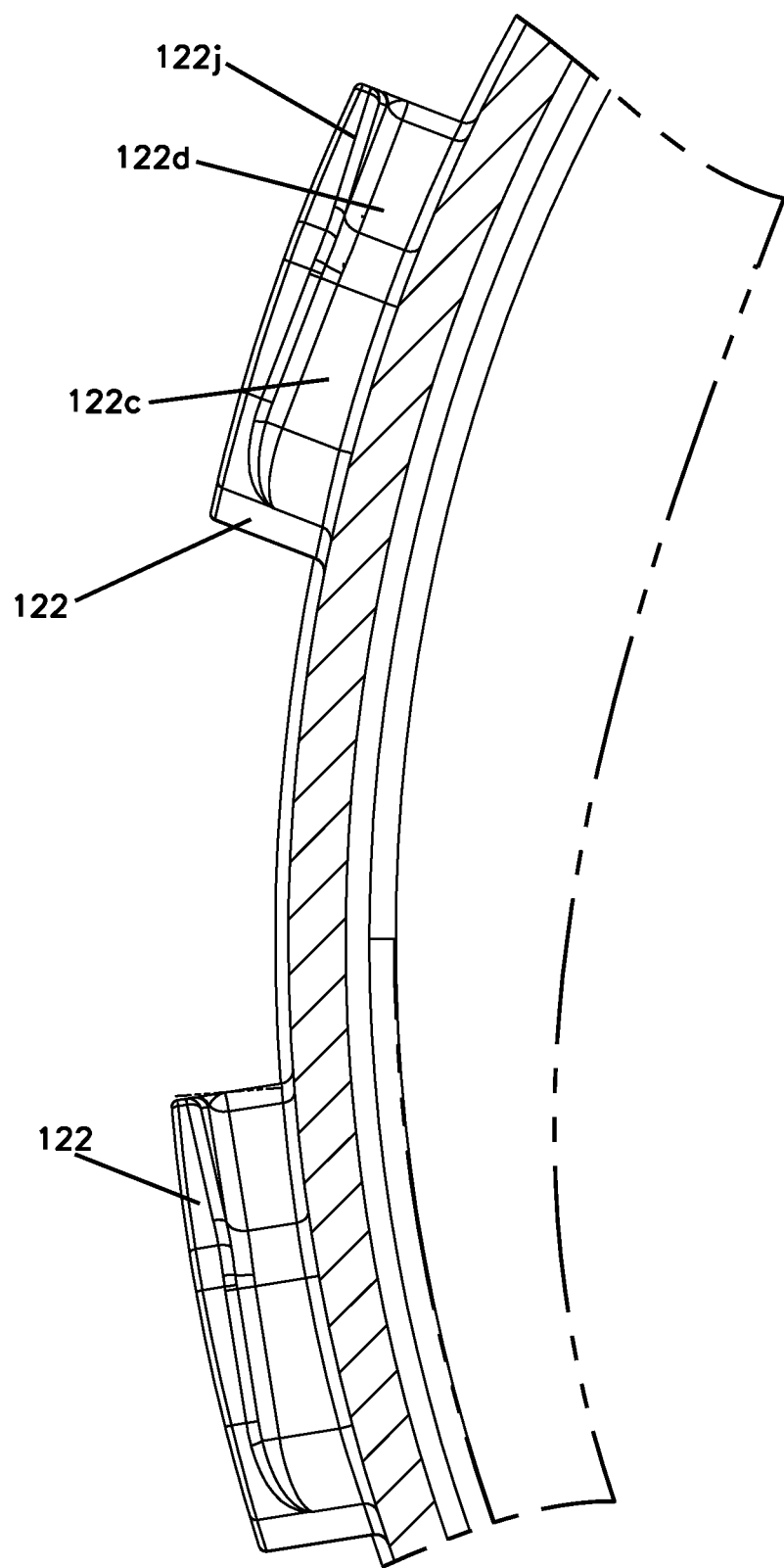
FIG. 12 is an enlarged schematic view of a portion of the housing body of the air cleaner assembly shown in FIG. 1, taken along the section line 12-12 shown in FIG. 11.

At this point, the cover 106 can be rotated in a direction C about the longitudinal axis X and along a plane of rotation R such that the ramped engagement surface 124a of each lug 124 is brought into engagement with the ramped engagement surface 122a of a corresponding lug 122, as shown at FIG. 10. As this rotation occurs, the ramped engagement surfaces 122a, 124a will function to draw the cover 106 towards the housing body 104 until a stop surface or shoulder 126 on the cover 106 comes into contact with the open end 128 of the housing body 104 at which point further rotation is prevented. In some embodiments, the length of the primary filter cartridge 200 is such that a compressive force is required to engage the shoulder 126 with the open end 128. In such instances, this compressive force increases the friction between the surfaces 122a, 124a and can aid in maintaining engagement between the lugs 122, 124. Additionally, where such a compression configuration exists, the air cleaner assembly 100 may be constructed such that the open end 128 and the shoulder 126 do not engage when the cover 106 is fully tightened onto the housing body 104.

To hold the cover 106 in this closed position relative to the housing body 104, a lock mechanism 160 can be provided which includes a lock member 162 that can be inserted between two adjacent lugs 122, 124 such that the cover 106 cannot be rotated in the reverse direction O to open the cover 106. In one example, a single lock mechanism 160 can be provided on the cover and can be associated with a single lug 124. In one example, multiple lock mechanisms 160 may be provided, wherein each of the lock mechanisms is associated with an individual lug 124. The removal of the cover 106 from the housing body 104 is conducted in the reverse of installation, wherein the lock member 162 is removed from between the adjacent lugs 122 and the cover 106 is rotated in an opening direction O until the lugs 124 are aligned between the lugs 122 such that the cover 106 can be pulled from the housing body 104 in the direction B. The configuration of the lugs 122, 124 and the lock mechanism 160 are discussed in further detail in the following paragraphs.

With reference to FIGS. 9-12, it can be seen that the perimeter of each of the lugs 122 is defined by surface 122a in addition to a side 122b, a side 122c, a guide surface 122d, a nose portion 122e, and a recessed portion 122f. Internally, a post portion 122h is provided between cavities 122g and 122i. The post portion 122h is provided for additional structural strength while the cavities 122g and 122i are provided to ensure that the remaining portions of the lug 122 are of the same general thickness as the other portions of the housing body 104 to ensure that the molding and cooling process occurs in as even a manner as possible.

Each of the lugs 122 is also provided with a guide member 122j extending from the guide surface 122d such that a guide channel is defined between the housing body 104 and the guide member 122j. The guide member 122j and housing body 104 function to laterally constrain the movement of the lock member 162 to ensure that the lock member 162 travels along the guide surface 122d as the lock member 162 is pressed downwardly in direction A.

Figure 9:
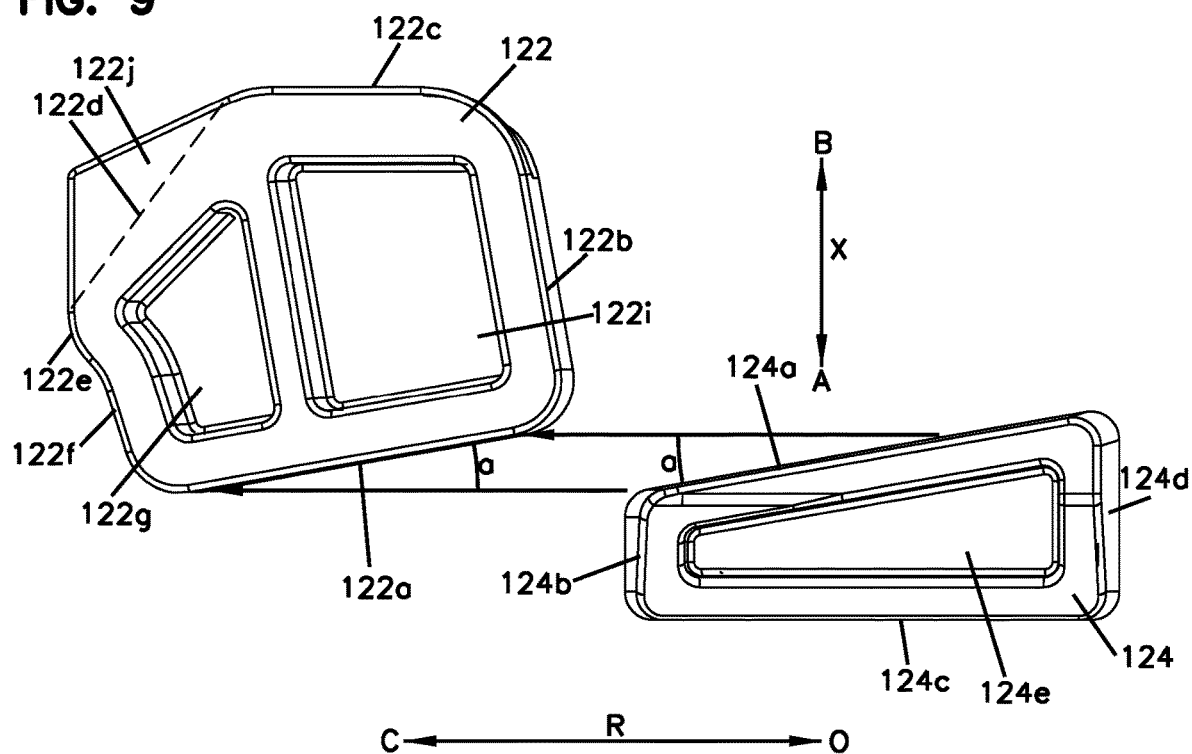
FIG. 9 is a schematic elevational view of a lug of the cover being aligned with a lug of the housing body of the air cleaner assembly shown in FIG. 1.
Figure 13:
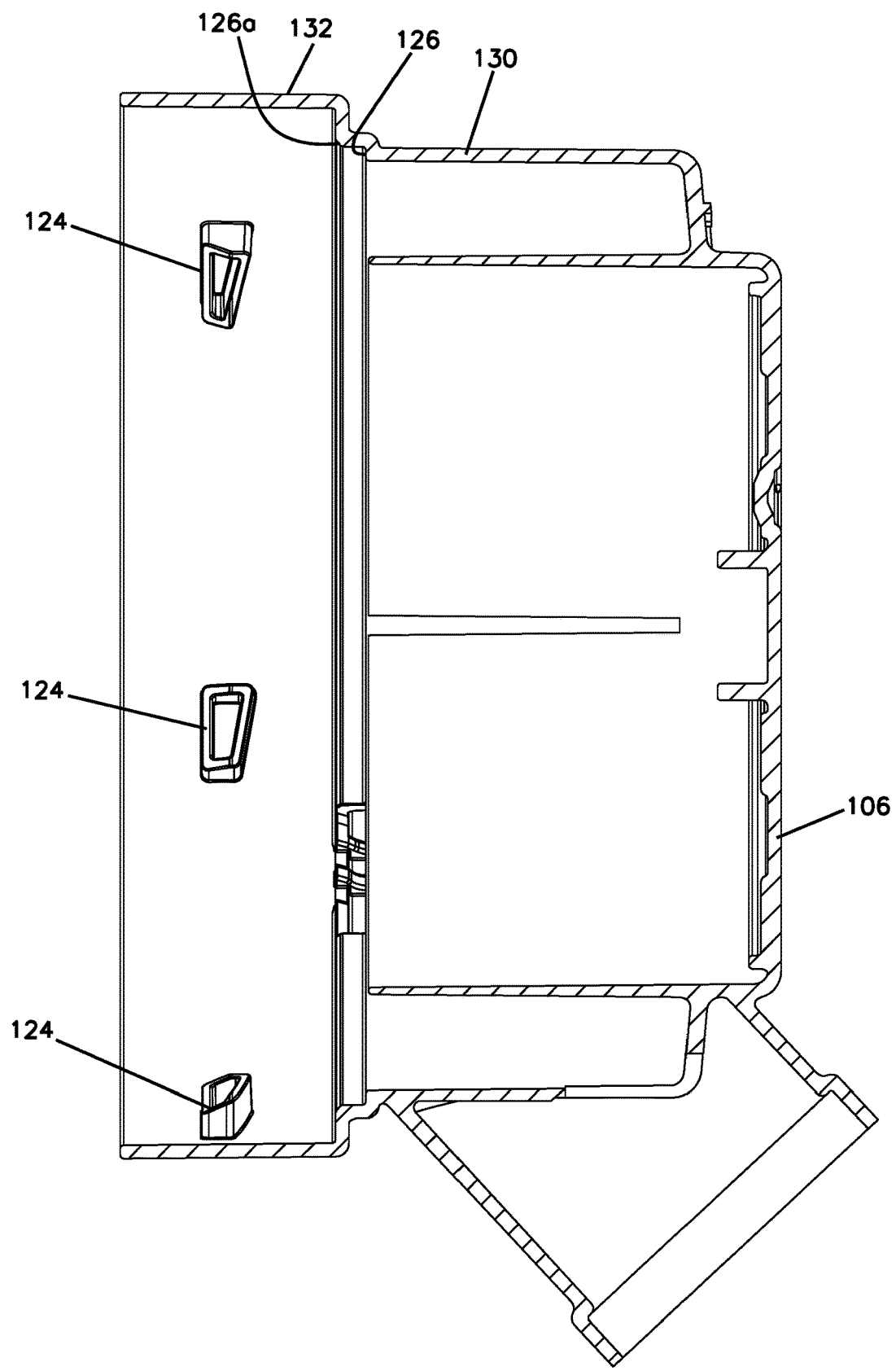
FIG. 13 is a schematic cross-sectional view of the cover of the air cleaner assembly shown in FIG. 1, taken along the line 13-13 in FIG. 23.
Figure 28:
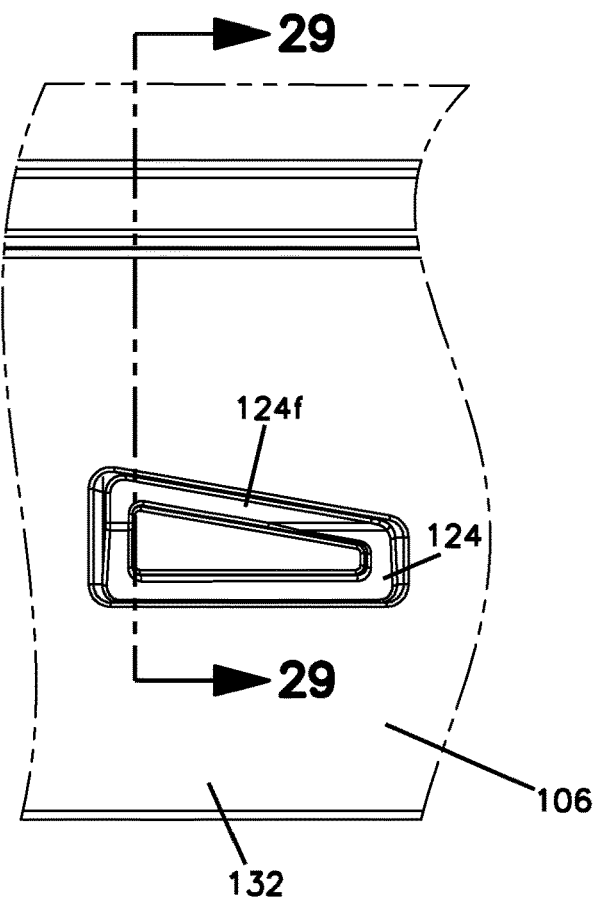
FIG. 28 is an enlarged elevational view of the inside of the cover shown in FIG. 13.
Figure 29:
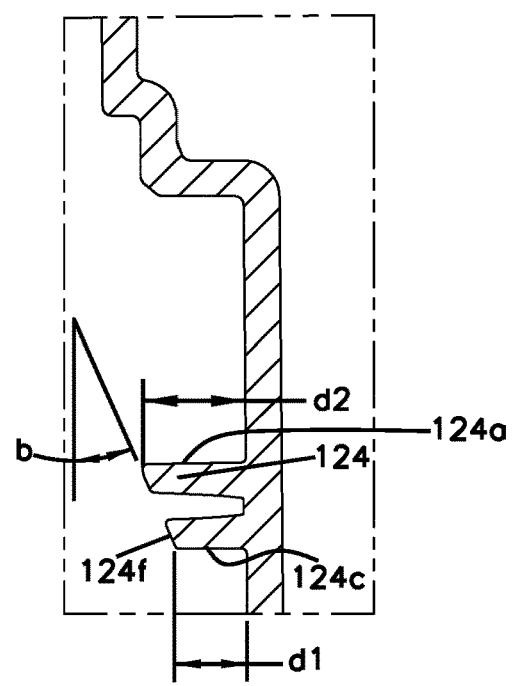
FIG. 29 is a cross-sectional view of the cover shown in FIG. 28, taken along the lines 29-29.

With continued reference to FIGS. 9-10 and with reference to FIG. 13, it can be seen that each of the ramped lugs 124 has a perimeter that is defined by the engagement surface 124a, a side 124b, a side 124c, and a side 124d. An internal cavity 124e is provided to ensure that the remaining portions of the lug 124 are of the same general thickness as the other portions of the cover 106 to ensure that the molding and cooling process occurs in as even a manner as possible. Each of the lugs 124 also has an interior face 124f which is disposed at an angle b such that the bottom surface 124c extends from the interior of the cover 106 (i.e. wall portion 132) a distance d1 and the top surface extends a distance d2 that is greater than distance d1. This configuration is most easily viewed at FIGS. 28 to 29. In one example, the angle b is about 24 degrees and distance d1 is about 4 millimeters. The disclosed construction allows the lugs 124 to have a wider diameter at the bottom surface 124c as compared to a corresponding diameter at the top surface 124a such that the clearance between the housing body wall 129 and the lug is greater at the bottom surface 124c than at the top surface 124a. This additional clearance enhances the ability of an operator to initially place the cover 106 over the housing body sidewall 129 and minimizes the need to have the cover 106 closely aligned with the housing body 104 such that the lugs 124 are able to slide over the sidewall 129 and between the lugs 122.

FIG. 13 also shows the cover 106 as having a first outer portion 130 and a second outer portion 132 having a larger diameter than the first outer portion 130. As can be seen, the lugs 124 are located on the interior side of the second portion 132. The shoulder 126 is shown as generally extending orthogonally from the second outer portion 132 towards the first outer portion 130. As stated previously, the open end 128 of the housing body 104 and the shoulder 126 are configured with similar or overlapping diameters to ensure that the open end 128 engages with the shoulder 126 to act as a stop against which the cover 106 can be no further closed onto the housing body 104. As shown, the shoulder 126 can be provided with a chamfered or rounded corner 126a to aid in guiding the housing open end 128 onto the shoulder 126.

Figure 14:
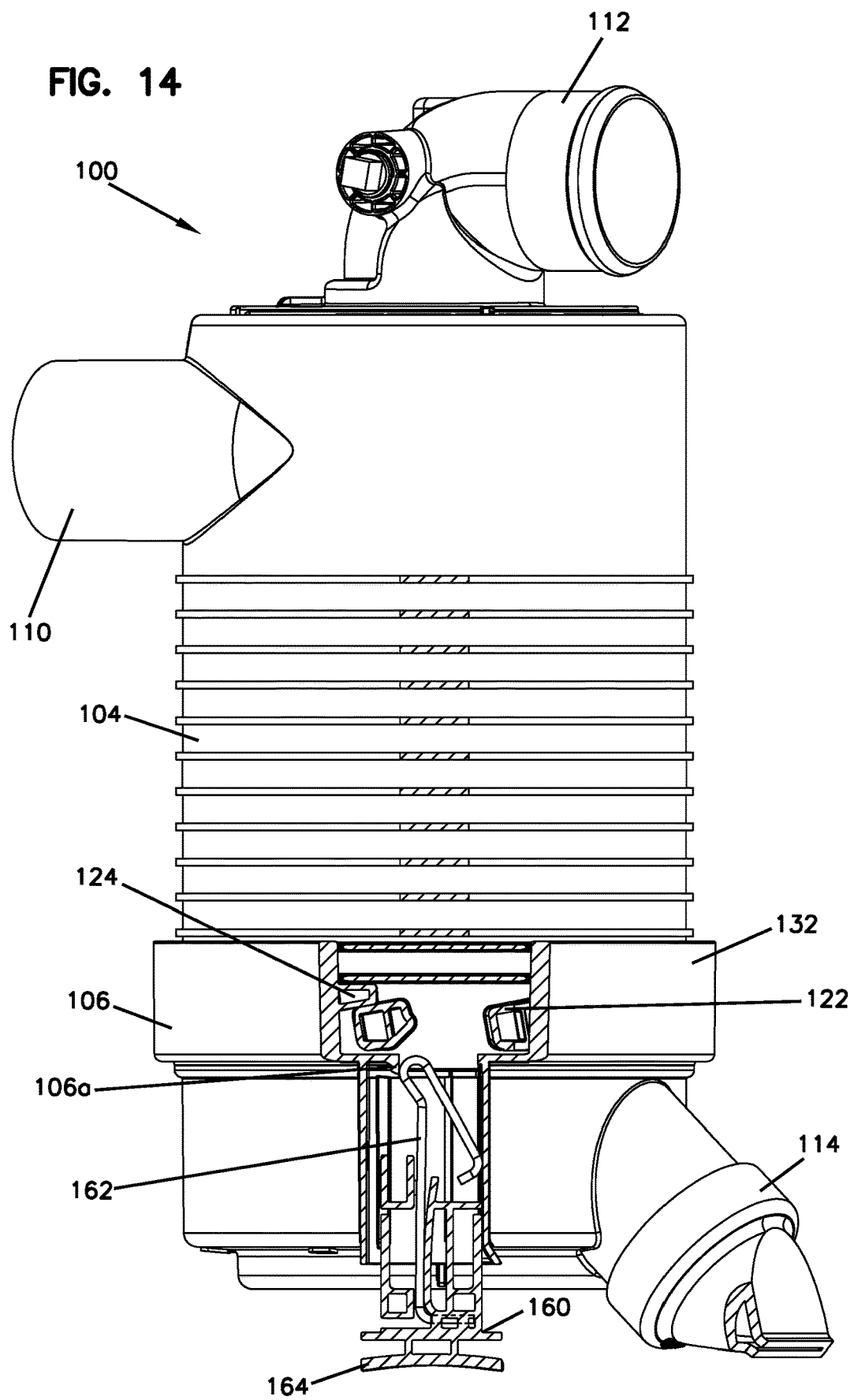
FIG. 14 is a schematic side view of the air cleaner assembly shown in FIG. 1, with a cut-a-way portion showing the lock mechanism in an unlocked position.
Figure 15:
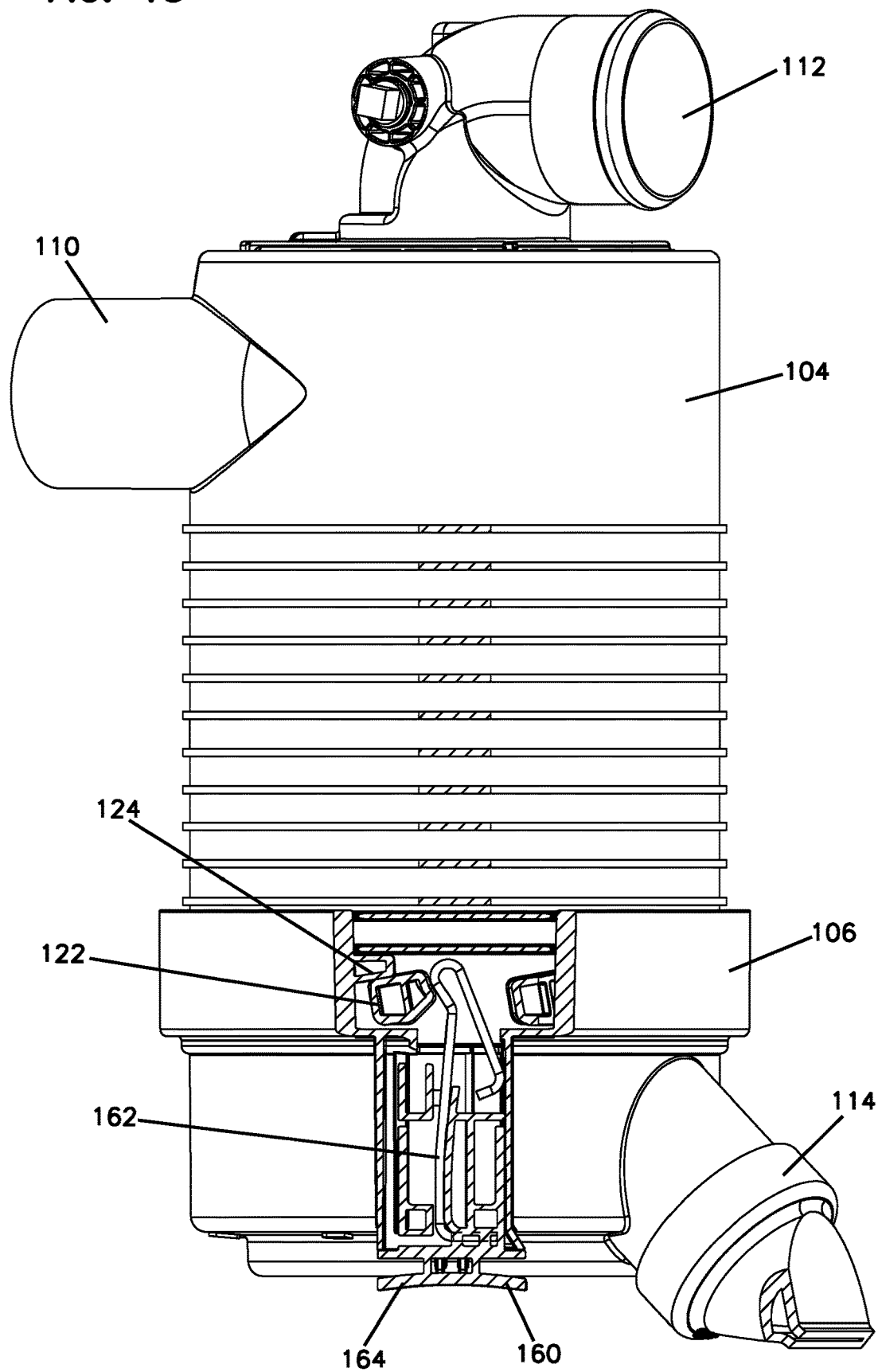
FIG. 15 is a schematic side view of the air cleaner assembly shown in FIG. 1, with a cut-a-way portion showing the lock mechanism in a locked position.
Figure 16:
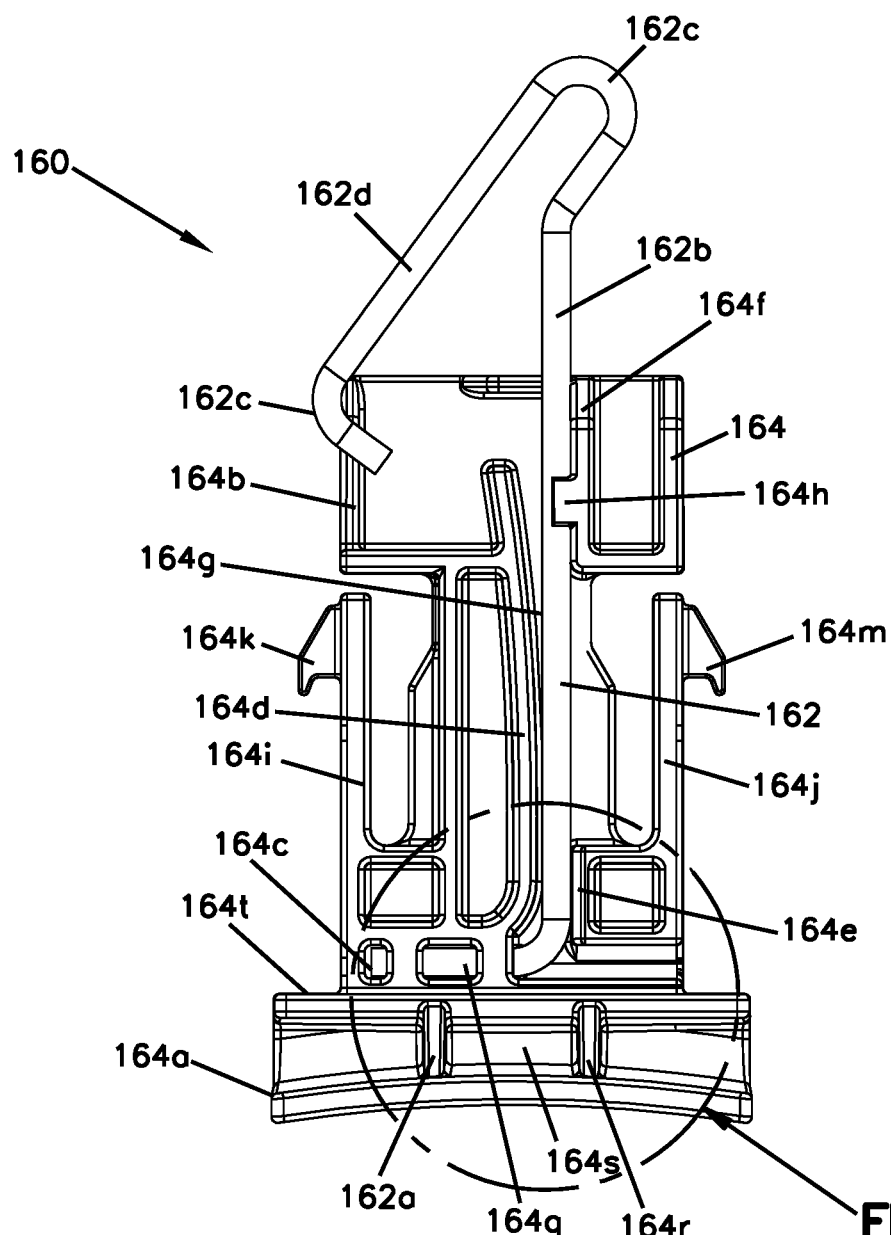
FIG. 16 is a front view of the lock mechanism of the air cleaner assembly shown in FIG. 1.
Figure 17:
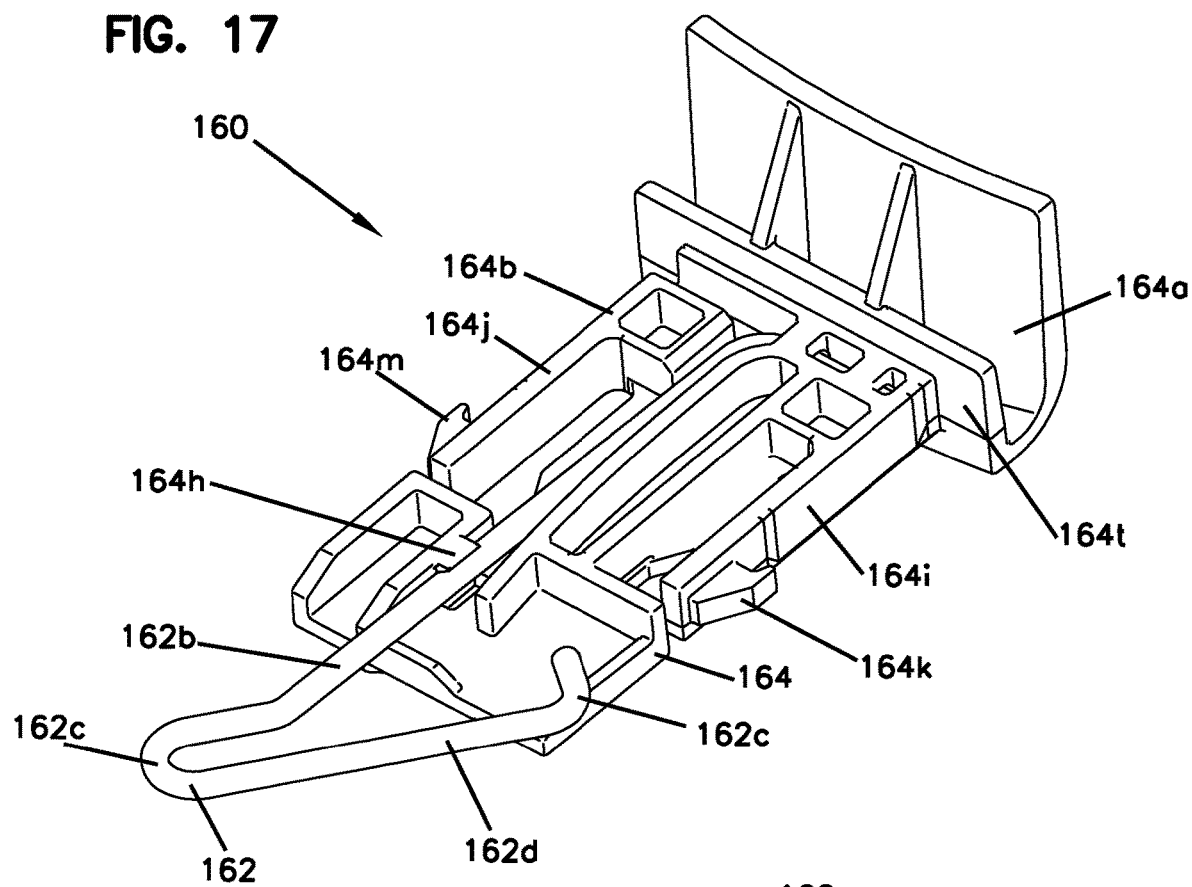
FIG. 17 is a perspective view of the lock mechanism shown in FIG. 16.
Figure 18:
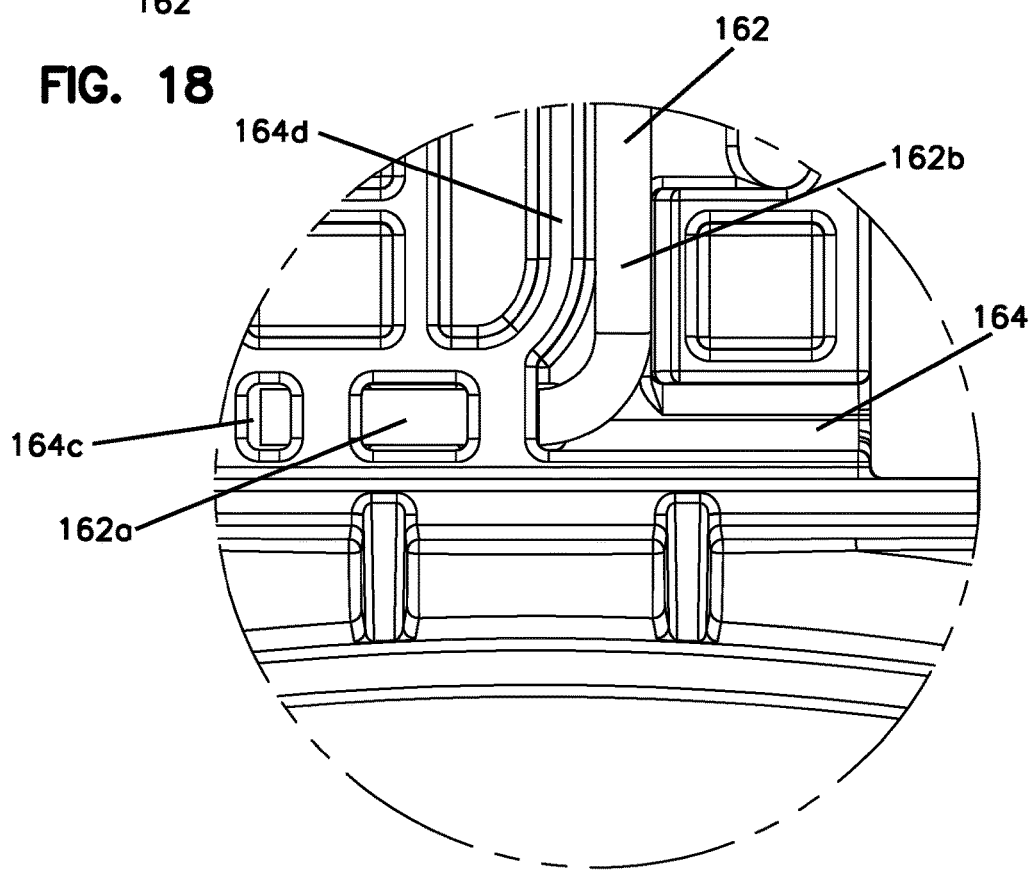
FIG. 18 is an enlarged portion of the lock mechanism shown at FIG. 16, as indicated at FIG. 16.
Figure 19:
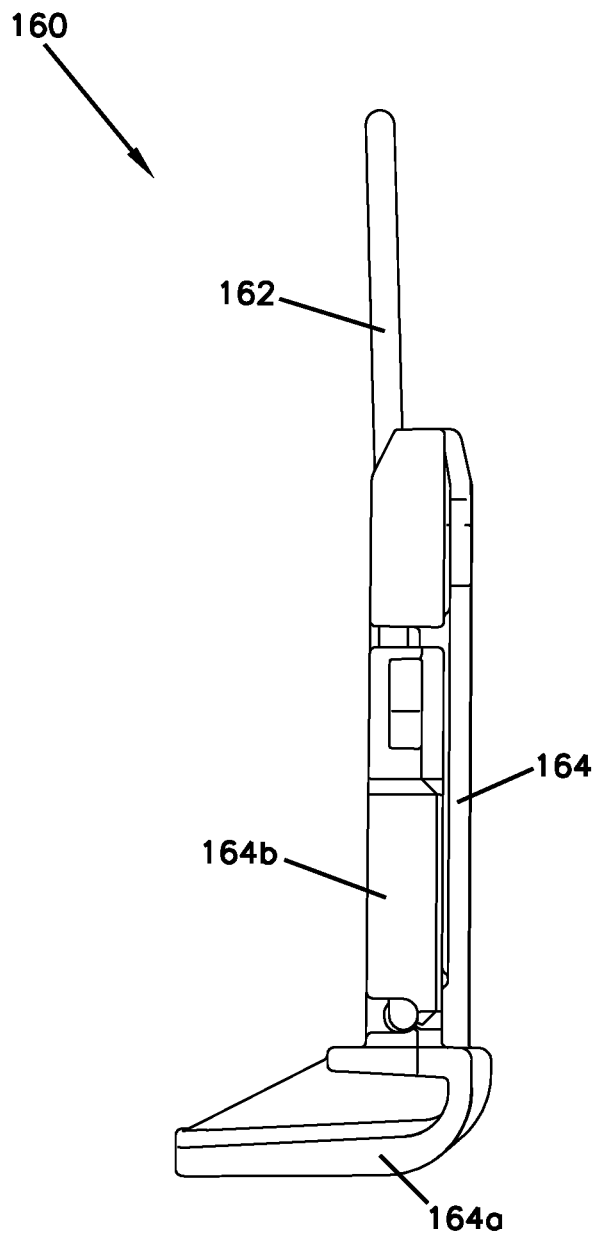
FIG. 19 is a side view of the lock mechanism shown in FIG. 16.
Figure 20:
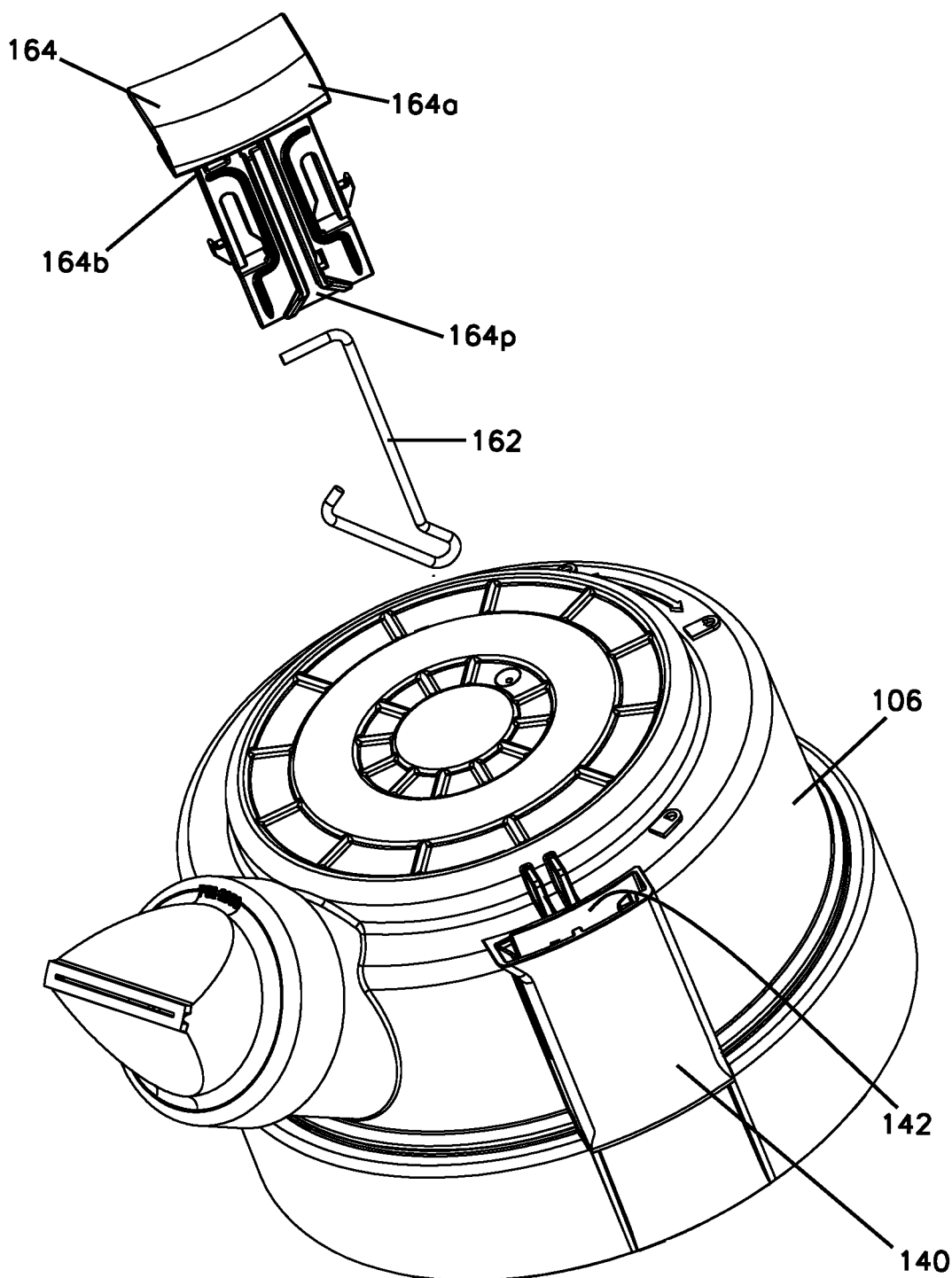
FIG. 20 is a partially exploded view of the cover and the lock mechanism shown in FIG. 16.
Figure 21:
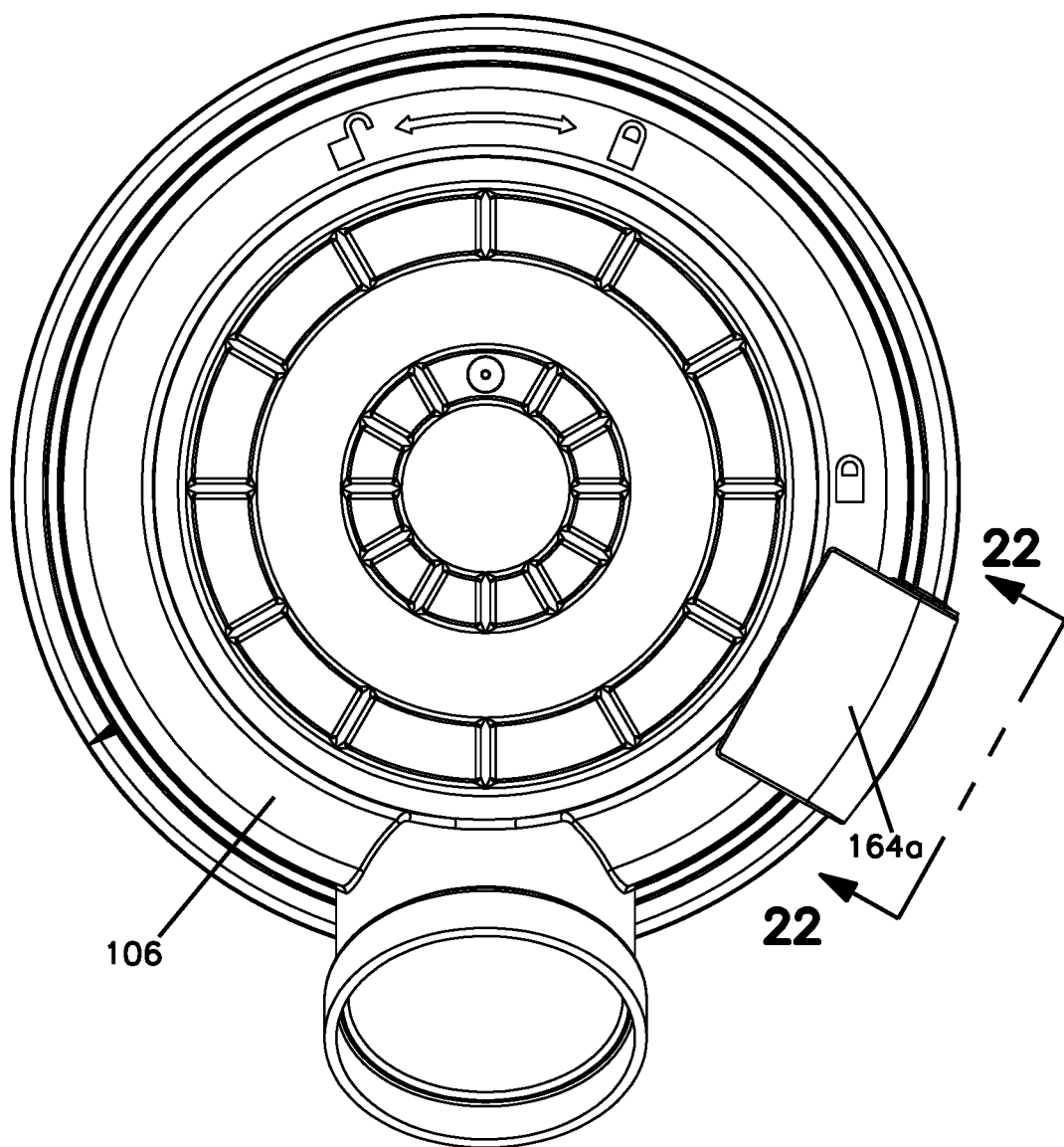
FIG. 21 is a top view of the cover and lock mechanism shown in FIG. 16.
Figure 22:
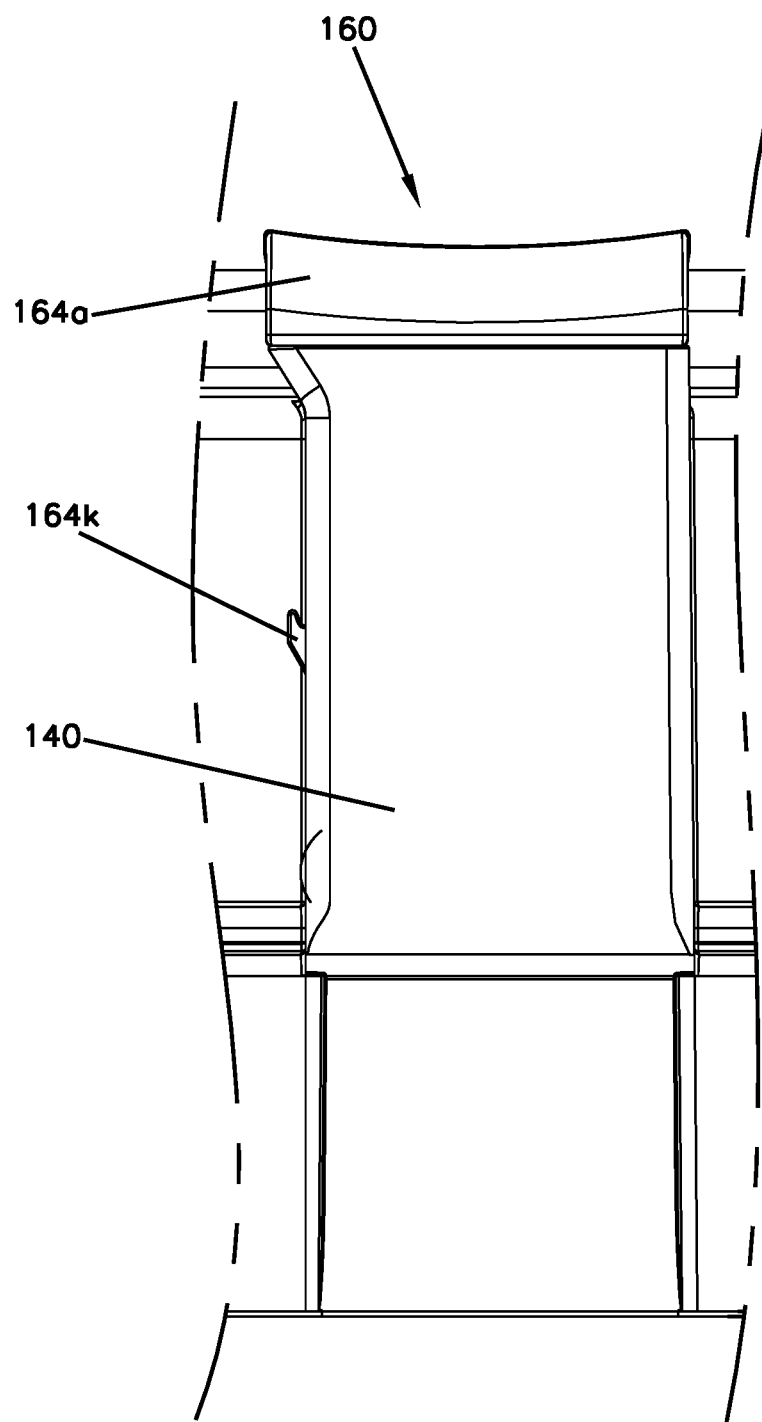
FIG. 22 is an enlarged portion of the cover and lock mechanism shown in FIG. 16, taken along the line 21-22 in FIG. 21.
Figure 23:
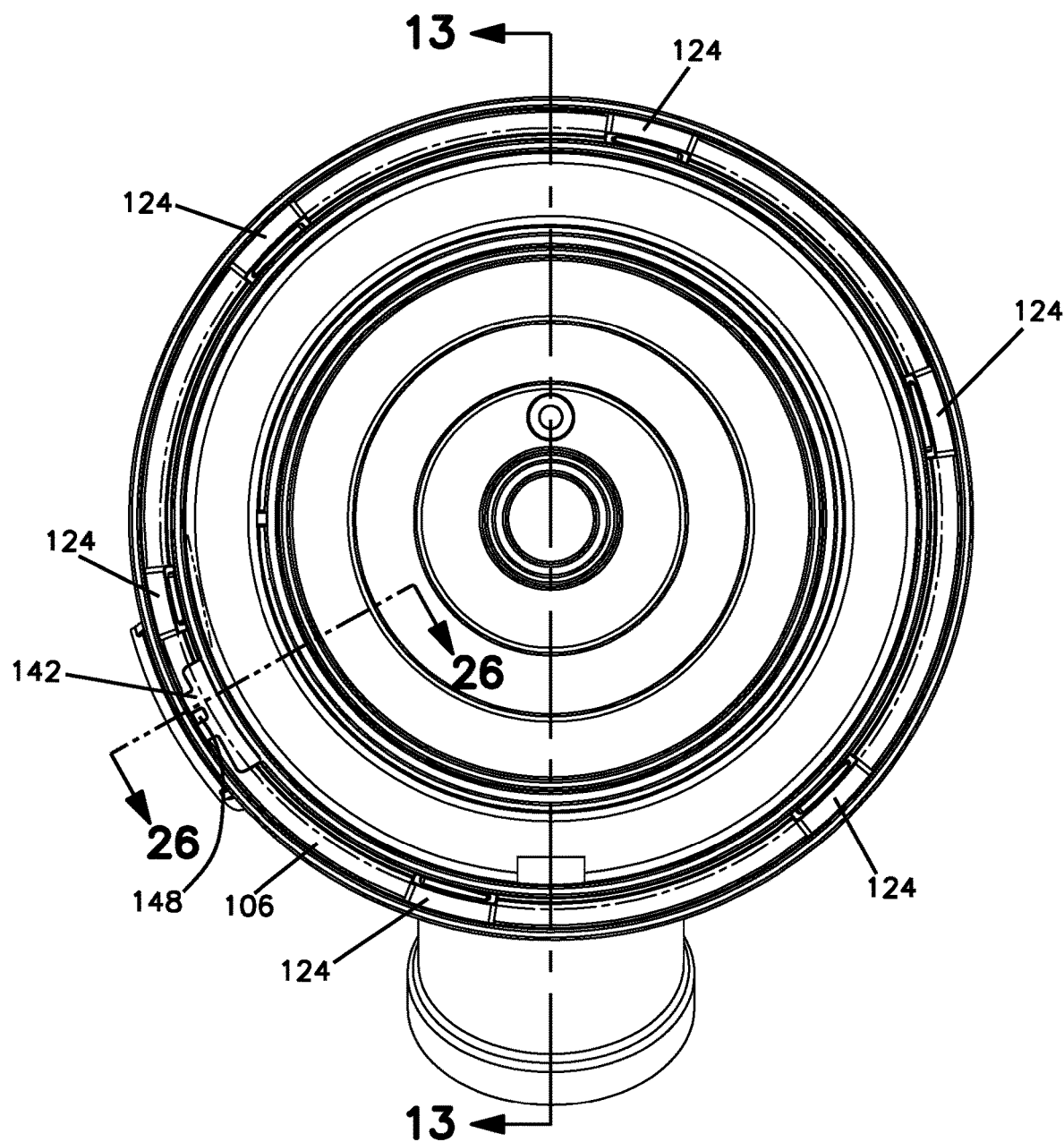
FIG. 23 is a bottom view of the cover of the air cleaner assembly shown in FIG. 1, with the lock assembly removed.
Figures 24, 25:
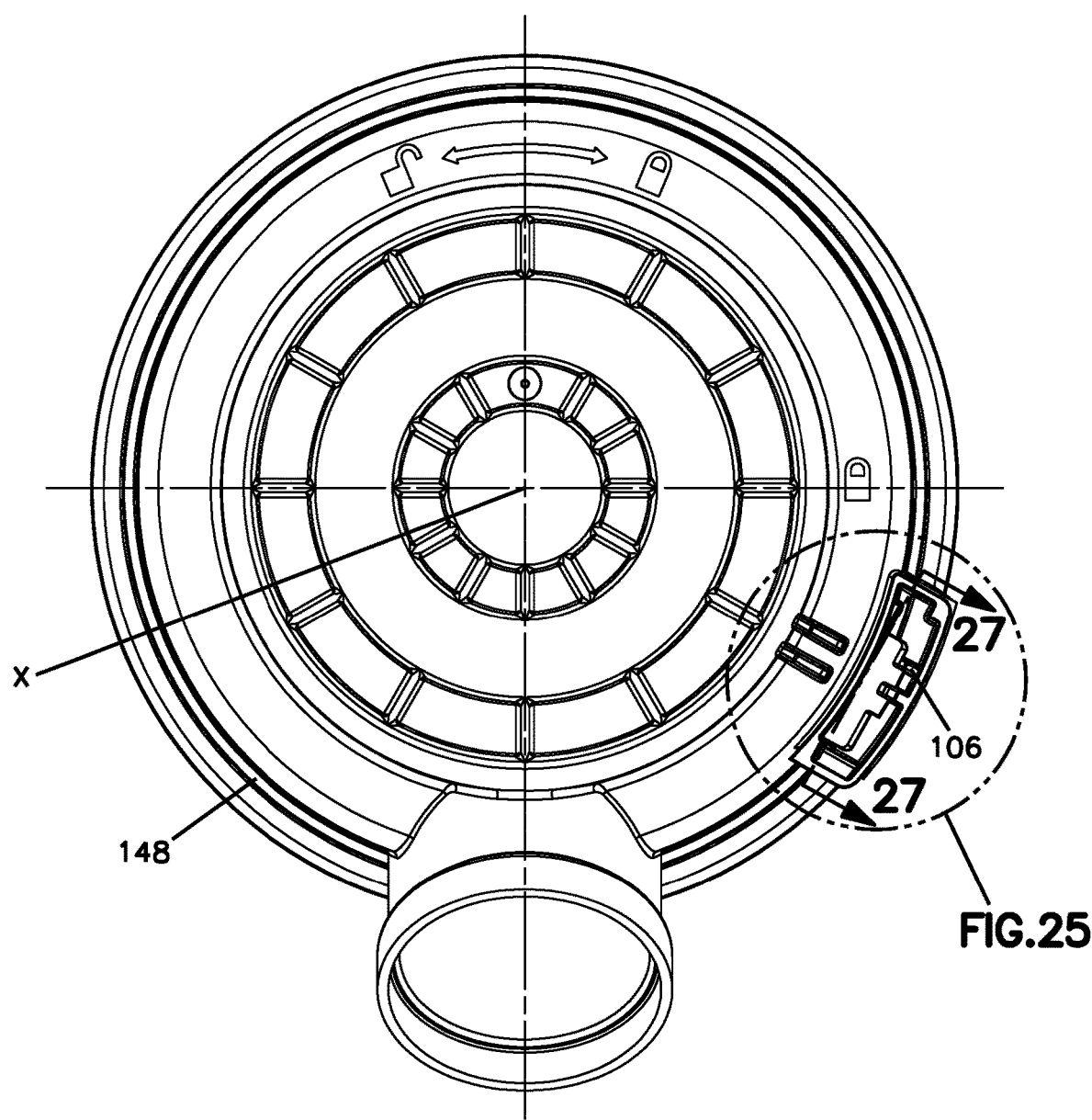
FIG. 24 is a top view of the cover of the air cleaner assembly shown in FIG. 1, with the lock assembly removed.
FIG. 25 is an enlarged top view of a portion of the cover of the air cleaner assembly shown in FIG. 1, as indicated at FIG. 24.
Figure 25:
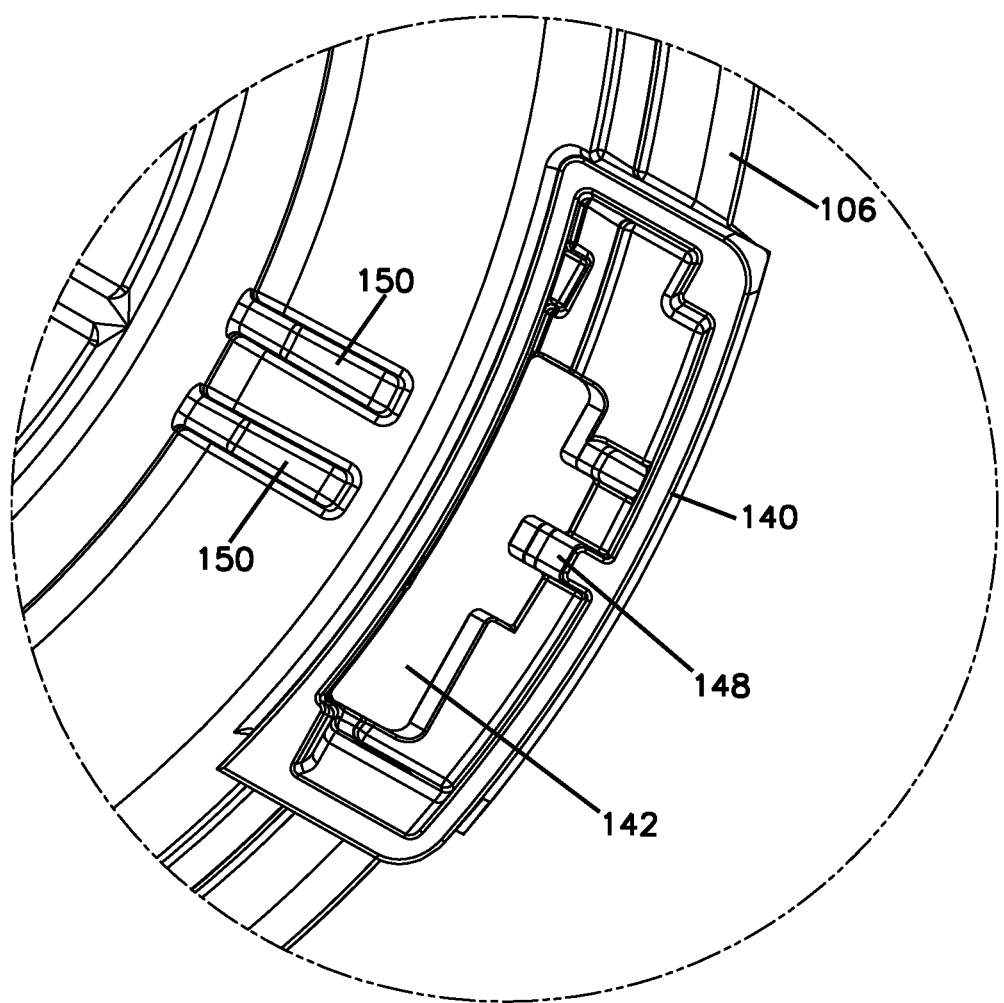

With reference to FIGS. 14-20, details of the lock mechanism 160 can be seen in further detail. It is noted that FIGS. 14 and 15 are drawn with portions of the cover 106 removed for the purpose of showing the function of the lock mechanism 160. FIG. 14 shows the lock mechanism 160 in an unlocked position while FIG. 15 shows the lock mechanism 160 in a locked position with the lock member 162 snapped against a lug 122 of the housing body 104. In addition to the lock member 162, the lock mechanism 160 also includes a main body 164 to which the lock member 162 is mounted. The main body 164 is shown as being a single-piece, integrally molded plastic component defining a handle portion 164a and an insert portion 164b. The handle portion 164a provides for a manual grasping point for a user to manually displace the lock mechanism in direction A towards a locked position and in direction B towards an unlocked position. The insert portion 164b is configured to be inserted into a cavity 142 of a receiving structure 140 defined within the cover 106. The cavity 142 extends from an exterior side of the cover 106, through the shoulder 126, and into the interior space defined by the cover outer portion 132. The handle portion 164a also defines a surface 164t that acts as a stop member against an end 146 of the receiving structure 140 such that a fully locked position of the lock mechanism 160 is defined.

In one aspect, the insert portion 164b defines a cavity 164c and sidewalls 164d, 164e, 164f that together define a channel 164g. Sidewall 164d is provided with a curved profile to allow the lock member 162 to bend against the sidewall 164d when the lock member 162 is deflected by engagement with a lug 122. This configuration reduces the point stress on the lock member 162 that would otherwise be exerted on the corner between segments 162a and 162b (discussed below) of the lock member 162.

The lock member 162 is provided as a bent metal wire having a first segment 162a, a second segment 162b disposed orthogonally to the first segment 162a, a rounded nose portion 162c extending at an oblique angle with respect to the second segment 162b, and a trailing segment 162d extending from the nose portion 162c that adjoins a rounded portion 162e. Although the lock member 162 is shown as being a metal wire having a circular cross-section, the lock member 162 is not limited to such a configuration. For example, the lock member 162 could have a differently shaped cross-section, such as a rectangular, square, oblong, oval, or another geometrically shaped cross-section. The lock member 162 could also be formed from materials other than a wire material. For example, the lock member 162 could be formed from a stamped sheet of metal, molded from a plastic material, or formed from a composite material. In a preferred embodiment, the lock member 162 is formed from a creep resistant material that has stress and strain properties that are generally independent of temperature variations. As such, forming the lock member 162 from a steel wire is a suitable choice. In one embodiment, the main body 164 can be overmolded onto the lock member 162. In one embodiment, the main body 164 and the lock member 162 are formed from the same material, such as a plastic material, a metal material, and/or a composite material.

To insert the lock member 162 onto the insert portion 164b, the first segment 162a is inserted into the cavity 164c with the lock member second segment 162b rotated away from the insert portion 164b. Once inserted, the lock member 162 can be rotated about the first segment 162a until the second segment 162b is received into the channel 164g. As shown, a retaining structure 164h can be provided on the insert portion 164b such that the second segment 162b can be received into the channel against the retaining structure 164h when the second segment 162b is in a relaxed, non-deflected position. The retaining structure 164h acts to laterally constrain the lock member 162 from rotating out of the channel 164g. Removal of the lock member 162 from the insert portion 164b is the reverse operation.

Figure 26:
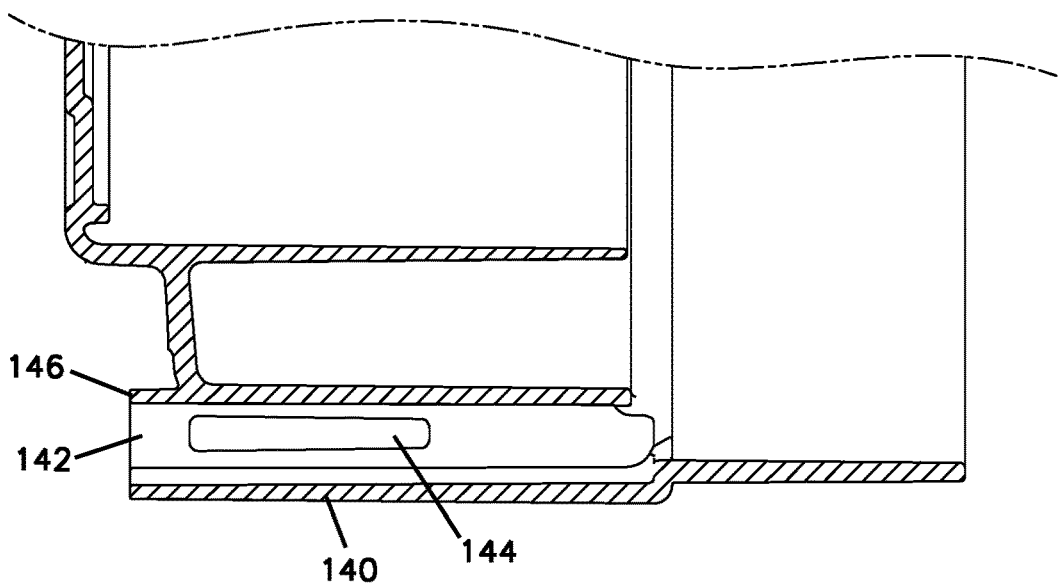
FIG. 26 is a cross-sectional view of a portion of the cover of the air cleaner assembly shown in FIG. 1, as indicated at line 26-26 at FIG. 23.
Figure 27:
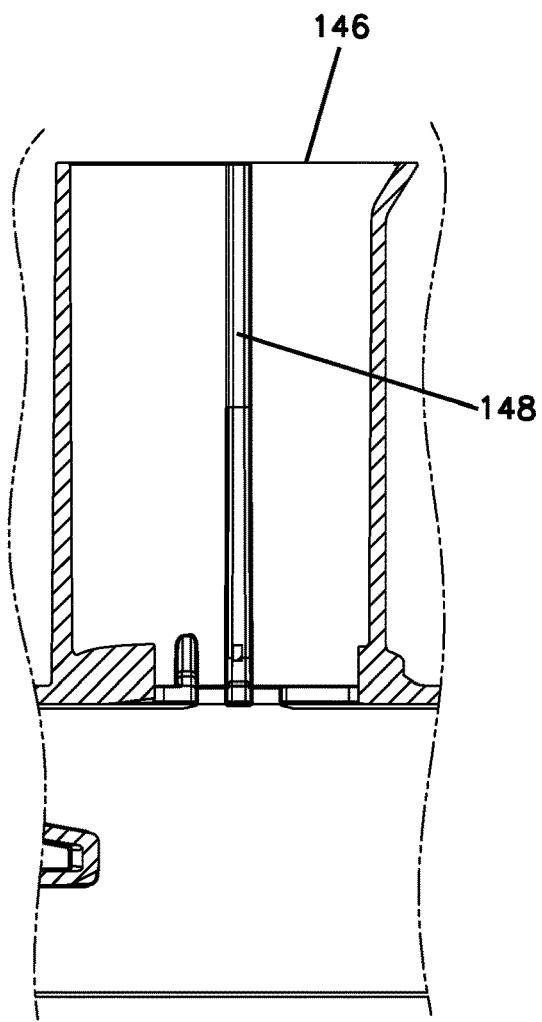
FIG. 27 is a cross-sectional view of a portion of the cover of the air cleaner assembly shown in FIG. 1, as indicated at line 27-27 at FIG. 24.

The main body 164 is shown as also including a pair of extension members 164i, 164j from which catch members 164k, 164m respectively extend. The extension members 164i, 164j are deflectable with respect to the remaining portions of the main body 164. As most easily seen at FIG. 26, the receiving structure can be provided with one or more slots 144 through which the catch members 164k, 164m can extend. To insert the lock mechanism 160 into the receiving structure 140, the lock mechanism 160 is aligned with the cavity 142 and inserted in direction A. Initially, the catch members 164k, 164m will deflect inwardly against the sidewalls of the receiving structure 140, which is enabled via bending of the extension members 164i, 164j. As the lock mechanism 160 is further inserted into the cavity, the catch members 164k, 164m will snap out into the slots 144, where provided. Once this position is achieved, the lock mechanism 160 can slide within the cavity 142 in the A-B direction, but cannot be removed from the cavity 142 without manually deflecting the catch members 164k, 164m back through the slots 144 while pulling the lock mechanism 160 from the cavity 142.

In the example shown, a single slot 144 is provided such that extension member 164j and catch member 164m remain permanently deflected against a solid sidewall of the receiving structure 140. This configuration can be advantageous in that the spring force provided by the extension member 164j can further stabilize the lock mechanism 160 within the cavity 142 and can reduce vibration.

On the opposite side of the cavity 142, the rounded portion 162e of the lock member is constructed to continuously contact the sidewall of the cavity 142. Additionally, the cover 106 is provided with a profiled sidewall 106a against which the lock member nose 162c can park against when the lock mechanism 160 is in the fully unlocked position. This configuration can be advantageous in that the lock mechanism 160 can be positively held from the lugs 122 while the cover is being rotated without requiring an operator to both hold the lock mechanism 160 in the unlocked position while simultaneously attempting to rotate the cover 106.

The insert portion 164b further includes a guide slot 164p which slidably engages with a guide rib 148 located within the cavity 142 to prevent binding and to ensure that the lock mechanism 160 maintains proper alignment within the cavity 142 as the lock mechanism 160 is being displaced in the A and B directions. The handle portion 148a can also include a pair of ribs 164q, 164r that together form a channel 164s that receive ribs 150 to further provide for alignment of the lock mechanism 160 with respect to the cover 106 when the lock mechanism is in the closed position.

Referring back to FIGS. 14 and 15, the operation of the lugs 122, 124 and the lock mechanism 160 can be further understood. It is noted that the lug 124 located most proximate the lock mechanism 160, which is the only lug 124 shown in FIGS. 14 and 15, is provided with a shorter length than the remaining lugs 124. This configuration ensures that the lug 124 does not block the lock member 162 from fully extending past the lug 122 against which it is snapped over. As can be seen at FIG. 15, it is not possible for the lug 124 to interfere with the lock member 162.

As the lock member 162 travels in the direction A, the lock member 162 nose portion 162c initially contacts the guide surface 122d and is prevented from deflecting laterally off of the guide surface 122d by the guide member 122j on one side and by the housing body 104 on the other side. As the lock member 162 is pushed further towards direction A via handle portion 164a, the nose portion 122e slides along the sloped guide surface 122d towards nose portion 122e of the lug 122. The nose portion 162c can deflect in such a manner due to bending in the segment 162b of the lock member 162. Eventually, the nose portion 162c of the lock member 162 deflects past the guide surface 122d and over the nose portion 122e and then snaps into the recessed portion 122f of the lug. Once the lock mechanism 160 is in this position, the cover 106 cannot be rotated in direction O towards the open position due to the lock member 162 being engaged against the lug 122 while the cover 106 can also not be rotated in direction C due to the interfering engagement of the lugs 122 with the lugs 124. As such, the cover 106 is securely held onto the housing body 104 once the lock mechanism 160 has been moved to the locked position such that the lock member 162 is disposed alongside and in contact with a portion of one of the lugs 122.

The lugs 122 and the lock member 162 are shaped such the snap-in feature draws the entire lock mechanism 160 in direction A towards the lock mechanism once the lock member nose portion 162c deflects past the lug nose portion 122e. The spring tension in the lock member 162 holds the lock member 162 in this position by virtue of the combined forces resulting from the bending of segment 162b and the rounded portion 162e engaging against the side of the cavity 142 which causes bending at segment 162d and/or nose portion 162c. Stated in other terms, at least two portions of the lock member 162 are in a deflected state due to interaction with a lug 124 and the cavity 142, wherein the combined resulting forces from the deflected portions result in continuous spring tension on the lug 124. It is noted that the lock member 162 can be provided with a relatively small cross-sectional dimension because of this dual resistance function. In an embodiment where portions 162d and 162e are not provided, the lock member 162 would need to have a larger cross-sectional dimension in order to have the same locking force.

The above described bending action forces the nose portion 162c in the direction of the recess 122f via segment 162d. Correspondingly, a greater force is initially required when moving the lock mechanism in direction B towards the unlocked position to snap the lock member nose portion 162c out of the recessed portion 122f and past the lug nose portion 122e. As this removal force can be significant, the catch member(s) 164k, 164m are provided to ensure that the lock mechanism 160 stays retained within the cavity 142 and does not pop out of cavity 142 due to the resulting velocity created by the removal force once resistance from the nose portion 122e overcome.

Figure 30:
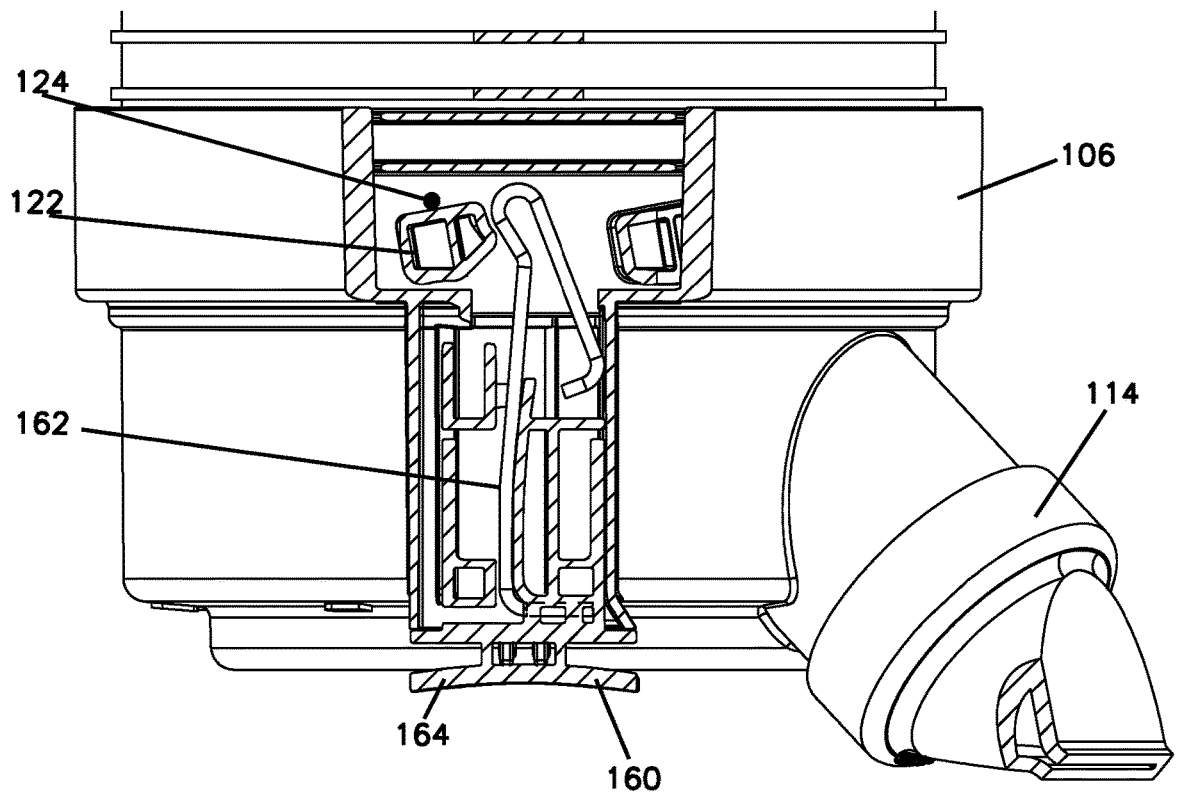
FIG. 30 is a schematic side view of the air cleaner assembly shown in FIG. 1, with a cut-a-way portion showing the lock mechanism in a locked position and showing a modified lug configuration.
Figure 31:
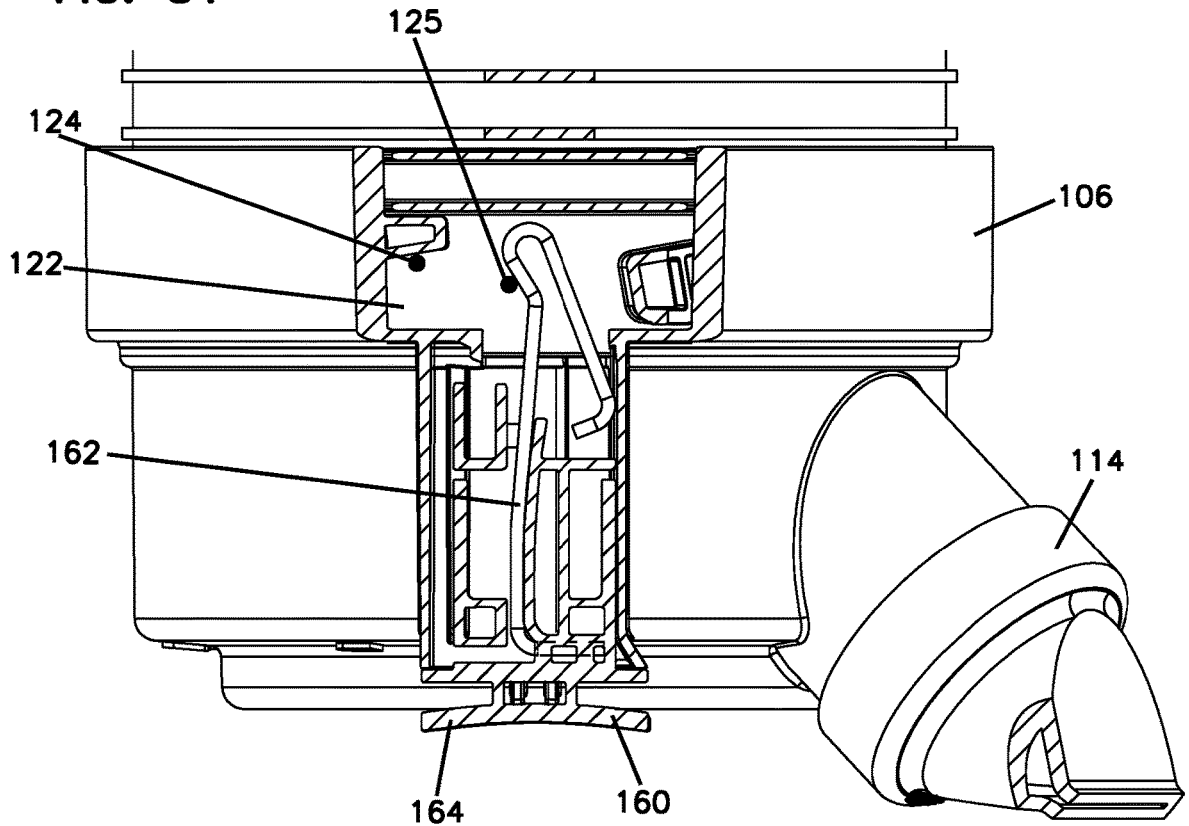
FIG. 31 is a schematic side view of the air cleaner assembly shown in FIG. 1, with a cut-a-way portion showing the lock mechanism in a locked position and showing a modified lug configuration.

Referring to FIGS. 30 and 31, it can be seen that the housing and cover lug configurations are not limited to those embodiments in which both the lugs 122 and the lugs 124 have ramped engagement surfaces. Rather, either one of the lugs 122, 124 can be provided with a ramped surface while the other of the lugs 122, 124 can be provided with any other type of surfaces that engages with the ramped surface. In the particular embodiment shown at FIGS. 30 and 31, the lugs 124 are provided as previously shown and described while the lugs 122 are provided as pins extending from the housing body 104. Although the pins 122 are shown as having generally round cross-section, other shapes may be used. Referring to FIG. 31, an additional set of lugs or pins 125 may be provided such that the lock member 162 has a surface on the housing body 104 to act against in the locked position. It is noted that the lugs 124 and 125 may be formed as a single lug having the same contact surfaces for the lugs 122 and the lock member 162.

The principles described herein can be applied in a variety of filter assemblies. Examples described in which the principles applied to (air) gas filter assemblies. Examples are described include air filters and crankcase ventilation filter assemblies. The principles can be applied to a variety of alternate gas filtration arrangements, in some instances even with liquid filter assemblies.

Again, the principles, techniques, and features described herein can be applied in a variety of systems, and there is no requirement that all of the advantageous features identified be incorporated in an assembly, system or component to obtain some benefit according to the present disclosure.

What is claimed is:

1. A lock mechanism for a filter cartridge assembly having a housing body and a removable cover, the lock mechanism comprising:
   a) a lock member configured to engage with an engagement surface of the housing body;
   b) the lock mechanism being movable between an unlocked position and a locked position:
      i) in the locked position, the locking member exerting a force against the engagement surface resulting from a first portion of the lock member being in a first deflected state due to engagement of the lock member against the engagement surface of the housing body and resulting from a second portion of the lock member being in a second deflected state due to engagement of the lock member against a portion of the removable cover.

2. The lock mechanism of claim 1, further comprising:
   a) a handle portion for operating the lock mechanism.

3. The lock mechanism of claim 2, wherein the handle portion is configured for insertion into the removable cover.

4. The lock mechanism of claim 1, wherein when the lock mechanism is in the unlocked position, the first portion of the lock member is in an undeflected state and the second portion is in a third deflected state.

5. The lock mechanism of claim 1, wherein at least part of the lock member first portion extends at an oblique angle with respect to the lock member second portion.

6. The lock mechanism of claim 1, further including a nose portion extending between the first portion and the second portion.

7. The lock mechanism of claim 6, wherein the nose portion extends at an oblique angle to the first portion.

8. The lock mechanism of claim 1, wherein the lock member is a steel wire.

9. The lock mechanism of claim 2, wherein the handle portion is formed from a plastic material.

10. The lock mechanism of claim 2, wherein the lock member is removably attached to the handle portion.

11. An air cleaner assembly comprising:
   a) a housing including a housing body and a removable cover that together define an interior volume for holding a filter cartridge, the removable cover being rotatable with respect to the housing body along a plane of rotation;
   b) a plurality of first lugs located on the housing body, the plurality of first lugs having a first ramped engagement surface oriented at an oblique first angle to the plane of rotation, wherein when the cover is provided with a plurality of second lugs, the plurality of first lugs engage with the plurality of second lugs when the cover is rotated along the plane of rotation with respect to the housing body; and
   c) a lock mechanism disposed on the cover, wherein when the lock mechanism is in a locked position, the lock mechanism resists rotation of the cover with respect to the housing body in at least one rotational direction.

12. The air cleaner assembly of claim 11, wherein each of the first plurality of lugs includes a guide surface for guiding a lock member towards a first side of one of the first plurality of lugs as the lock member is being displaced between two of the first plurality of lugs.

13. The air cleaner assembly of claim 12, wherein each of the first plurality of lugs includes a guide member extending from the guide surface, the guide member constraining the movement of the lock member along the guide surface.

14. The air cleaner assembly of claim 13, wherein each of the first plurality of lugs includes a recessed portion and wherein the lock member includes a nose portion that snaps into the recessed portion when the lock mechanism is moved to the locked position.

15. The air cleaner assembly of claim 11, wherein the first angle is about 10 degrees.

16. A housing for an air cleaner assembly comprising:
   a) a housing body including a sidewall, an end wall, and an open end opposite the end wall, the sidewall and end wall defining an interior volume for holding a filter cartridge; and
   b) a plurality of lugs configured for engaging with a plurality of corresponding lugs on a cover of the housing, the plurality of lugs being circumferentially arranged about an outer surface of the housing body sidewall, the plurality of lugs having a first ramped engagement surface oriented at an oblique angle to a plane defined by the housing body open end.

17. The housing of claim 16, wherein each of the first plurality of lugs includes a guide surface for guiding a lock member towards a first side of one of the first plurality of lugs as the lock member is being displaced between two of the first plurality of lugs.

18. The housing of claim 17, wherein each of the first plurality of lugs includes a guide member extending from the guide surface, the guide member constraining the movement of the lock member along the guide surface.

19. The housing of claim 18, wherein each of the first plurality of lugs includes a recessed portion and wherein the lock member includes a nose portion that snaps into the recessed portion when the lock mechanism is moved to a locked position.

20. The housing assembly of claim 16, wherein the first angle is about 10 degrees.

* * * * *